(12) United States Patent
Celano et al.

(10) Patent No.: US 12,169,777 B2
(45) Date of Patent: *Dec. 17, 2024

(54) ARTIFICIAL-INTELLIGENCE-BASED WATERWAY INFORMATION SYSTEM

(71) Applicant: Trabus, San Diego, CA (US)

(72) Inventors: Joseph Celano, San Diego, CA (US); David Sathiaraj, San Diego, CA (US); Eric Ho, San Diego, CA (US); Andrew Nolan Smith, San Diego, CA (US); Eric Vincent Rohli, Baton Rouge, LA (US)

(73) Assignee: TRABUS, San Diego, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 18/128,839

(22) Filed: Mar. 30, 2023

(65) Prior Publication Data

US 2023/0237327 A1    Jul. 27, 2023

Related U.S. Application Data

(63) Continuation of application No. 17/720,782, filed on Apr. 14, 2022, now Pat. No. 11,620,523, which is a
(Continued)

(51) Int. Cl.
*G01C 21/00*   (2006.01)
*B63B 79/40*   (2020.01)
(Continued)

(52) U.S. Cl.
CPC .............. *G06N 3/08* (2013.01); *B63B 79/40* (2020.01); *G01C 21/203* (2013.01); *G06N 3/04* (2013.01); *G08G 3/00* (2013.01); *B63B 2213/00* (2013.01)

(58) Field of Classification Search
CPC . G06N 3/08; G06N 3/04; B63B 79/40; B63B 2213/00; G01C 21/203; G08G 3/00
(Continued)

(56) References Cited

U.S. PATENT DOCUMENTS 6,317,686 B1    11/2001   Ran
11,397,087 B1    7/2022   Mishra
(Continued)

FOREIGN PATENT DOCUMENTS

GB    2474715 A    *   4/2011    ............. B63B 43/18

OTHER PUBLICATIONS

Oleh Bodunov, Florian Schmidt, André Martin, Andrey Brito, Christof Fetzer, "Grand Challenge: Real-time Destination and ETA Prediction for Maritime Traffic," Jun. 25-29, 2018, ACM International Conference on Distributed and Event-based Systems, whole document. (Year: 2018).*

(Continued)

*Primary Examiner* — Tiffany P Ohman
(74) *Attorney, Agent, or Firm* — Procopio, Cory, Hargreaves & Savitch LLP

(57) ABSTRACT

Artificial-intelligence-based river information system. In an embodiment, a first training dataset is used to train a travel time prediction model to predict a travel time along the waterway for a given trip. In addition, a second training dataset is used to train a river level prediction model to predict a river level along the waterway for a given time. For each of a plurality of trips, a request is received that specifies the trip and a time of the trip, and, in response to the request, the travel time prediction model is used to predict a travel time for the trip, and the river level prediction model is used to predict a river level of the waterway at one or more points (Continued)

along the trip. Then, a voyage plan is generated based on one or both of the predicted travel time and the predicted river level.

20 Claims, 16 Drawing Sheets

Related U.S. Application Data continuation of application No. 17/190,254, filed on Mar. 2, 2021, now Pat. No. 11,334,794.

(60) Provisional application No. 63/017,508, filed on Apr. 29, 2020, provisional application No. 63/016,568, filed on Apr. 28, 2020.

(51) Int. Cl.
  *G01C 21/20* (2006.01)
  *G06N 3/04* (2023.01)
  *G06N 3/08* (2023.01)
  *G08G 3/00* (2006.01)
(58) Field of Classification Search
  USPC .......................................................... 706/21
  See application file for complete search history.

(56) References Cited

U.S. PATENT DOCUMENTS

| | | |
|---|---|---|
| 2010/0168942 A1 | 7/2010 | Noffsinger et al. |
| 2010/0324811 A1 | 12/2010 | Bruce et al. |
| 2011/0231335 A1 | 9/2011 | Kocis et al. |
| 2012/0277941 A1 | 11/2012 | Noffsinger |
| 2014/0067257 A1 | 3/2014 | Dave |
| 2020/0209002 A1 | 7/2020 | Hou |
| 2020/0264268 A1* | 8/2020 | Moore ................ G06V 20/52 |
| 2021/0172754 A1 | 6/2021 | Nunkesser |
| 2021/0191424 A1* | 6/2021 | Drayna ............ G08G 1/096775 |

OTHER PUBLICATIONS

Chengkai Zhang, "AIS Data-Driven General Vessel Destination Prediction: a Trajectory Similarity-Based Approach," Sep. 2019, The University of British Columbia, whole document. (Year: 2019).*
Zhang et al. "Flow Modeling and Rendering to Support 3D River Shipping Based on Cross-Sectional Observation Data", ISPRS Int. J. Geo—Inf. Sep. 3, 2020. Retrieved on Feb. 5, 2021. Retrieved from <URL: https://www.mdpi.com/2220-9964/9/3/156>.
International Search Report and Written Opinion dated Jul. 15, 2021 for PCT/US2021/025651.
Nobuaki Kimura, Ikuo Yoshinaga, Kenji Sekijima, Issaku Azechi, and Daichi Baba, "Convolutional Neural Network Coupled with a Transfer-Learning Approach for Time-Series Flood Predictions," Dec. 26, 2019, MDPI, whole document. (Year: 2019).
Rana Singh, "Taxi demand prediction in New York City," Sep. 4, 2019, whole document. (Year: 2019).
Li Qiang, Yang Bing-Dong, Hong Bi-Guang, "Calculation and Measurement of Tide Height for the Navigation of Ship At High Tide Using Artificial Neural Network," 2018, Polish Maritime Research, Special Issue, S3 pp. 99-110 whole document. (Year: 2018).
Enmei Tu, Guanghao Zhang, Shangbo Mao, Lily Rachmawati, and Guang-Bin Huang, "Modeling Historical AIS Data For Vessel Path Prediction: A Comprehensive Treatment," Mar. 31, 2020, IEEE, whole document. (Year: 2020).

* cited by examiner

ARTIFICIAL-INTELLIGENCE-BASED WATERWAY INFORMATION SYSTEM

CROSS-REFERENCE TO RELATED APPLICATIONS

The present application is a continuation of U.S. patent application Ser. No. 17/720,782, filed on Apr. 14, 2022, which is a continuation of U.S. patent application Ser. No. 17/190,254, filed on Mar. 2, 2021, which claims priority to U.S. Provisional Patent Application No. 63/016,568, filed on Apr. 28, 2020, and U.S. Provisional Patent App. No. 63/017,508, filed on Apr. 29, 2020, which are all hereby incorporated herein by reference as if set forth in full.

BACKGROUND

Field of the Invention

The embodiments described herein are generally directed to waterway information, and, more particularly, to the use of artificial intelligence, such as machine-learning, to provide waterway information, such as predicted travel times, river levels, under-keel clearances, bridge clearances, and/or the like.

Description of the Related Art

Inland waterways are an important part of national transportation networks. For example, the United States contains over 25,000 miles of navigable rivers, with 20 states having access to the Gulf of Mexico. Annually, over one billion tons of freight, valued at over $110 billion, is transported over these waterways, by a fleet of approximately 5,500 tugboats and towboats and more than 31,000 barges. In addition, when water levels are favorable, the rivers are a source of recreation, a means of power generation, and an alternative means of transportation.

However, river information technology remains antiquated and disconnected. There are multiple data sources, but no common unifying framework and no available analytics, for example, for increased transportation safety and efficiency. Hand-written reports are still prevalent in the industry, and key decision variables for voyage planning are still calculated based on past marine experiences along with a lot of guess work. In addition, vessels carrying certain dangerous cargo pose a threat to maritime safety and are difficult to identify.

SUMMARY

Accordingly, a unified and improved information management system is needed. In an embodiment, the disclosed system provides a common data framework and leverages artificial intelligence (AI), such as machine-learning, to provide key variables for voyage planning, as well as other predictive analytics.

In an embodiment, a method comprises using at least one hardware processor to: use a first training dataset, comprising positional and non-positional data representing trips with known travel times along a waterway, to train a travel time prediction model to predict a travel time along the waterway for a given trip; use a second training dataset, comprising weather data and river level data, to train a river level prediction model to predict a river level along the waterway for a given time; and, for each of a plurality of trips, receive a request that specifies the trip and a time of the trip, and, in response to the request, use the travel time prediction model to predict a travel time for the trip, and use the river level prediction model to predict a river level of the waterway at one or more points along the trip, and generate a voyage plan based on one or both of the predicted travel time and the predicted river level.

The travel time prediction model may comprise a gradient boosting model. The gradient boosting model may comprise an XGBoost model. Training the XGBoost model may comprise optimizing parameters of the XGBoost model using a random search.

The method may further comprise generating the first training dataset, wherein generating the first training dataset comprises correlating positional data, indexed by first identifiers of vessels, with non-positional data, indexed by second identifiers of vessels, wherein the positional data comprises, for each of a plurality of vessels, information representing trips that the vessel completed along a waterway, and wherein the non-positional data comprises, for each of the plurality of vessels, one or more attributes of the vessel. The one or more attributes of the vessel may comprise at least one physical dimension of the vessel.

The positional data may comprise Automatic Identification System (AIS) data comprising a plurality of AIS messages, and generating the first training dataset may further comprise creating a plurality of training trips from the correlated positional data and non-positional data by, for each of the plurality of vessels, bundling a subset of the plurality of AIS messages, in which the vessel is identified, together into one or more trips, based on one or more criteria.

The one or more criteria comprise: each subset must comprise a plurality of AIS messages; an AIS message is not added to a non-empty subset unless either a time interval between the AIS messages and an AIS message in the subset is less than or equal to a first predefined threshold, or the time interval is less than a second predefined threshold, which is greater than the first predefined threshold, and the vessel traveled at least a predefined speed during the time interval; and a training trip ends whenever either a speed of the vessel becomes zero, a direction of the vessel changes between upstream and downstream, or the vessel stops at a lock.

The river level prediction model may comprise a convolutional neural network.

The method may further comprise generating the second training dataset, wherein generating the second training dataset comprises, for each of a plurality of time intervals and for each of a plurality of measurement stations that acquired river level data: correlating the river level data, acquired by the measurement station during the time interval, with weather data, acquired by another measurement station, which is associated with the measurement station based on a distance between the measurement station and the other measurement station, during the time interval; and adding a data structure, comprising the correlated river level data and weather data for the time interval, to the second training dataset.

The measurement station may comprise a sensor site along a river, and wherein the other measurement station comprises a sensor site at an airport.

The method may further comprise using the at least one hardware processor to, for each of the plurality of trips, in response to the request, use vessel data for a vessel and the predicted river level to predict an under-keel clearance for the vessel at the one or more points along the trip, wherein the voyage plan is further based on the predicted under-keel clearance.

The method may further comprise using the at least one hardware processor to, for each of the plurality of trips, in response to the request, when a bridge exists over the waterway along the trip, use the non-positional data, the predicted river level, and bridge height data to predict a bridge clearance for the bridge, wherein the voyage plan is further based on the predicted bridge clearance.

The voyage plan may be further based on one or more of reference data regarding the waterway, notices to skippers, or lock data.

The method may further comprise using the at least one hardware processor to: generate a graphical user interface that represents the voyage plan, wherein the graphical user interface comprises a virtual map comprising a view of a geographical map, a traffic indicator overlaid on a representation of the waterway, wherein the traffic indicator indicates predicted traffic levels at a plurality of positions along a route of the trip, and one or more selectable markers along the route of the trip; and in response to a user selection of one of the one or more selectable markers, overlay information about a feature represented by the selected marker in the graphical user interface.

The method may further comprise using the at least one hardware processor to: use a third training dataset, comprising representations of calamity incidents correlated with waterway conditions, to train a calamity prediction model to predict a calamity along the waterway; apply the calamity prediction model to real-time data, comprising waterway conditions, to predict a likelihood of one or more calamities along the waterway; and alert at least one recipient if the predicted likelihood exceeds a threshold.

The method may further comprise, using the at least one hardware processor to, for each of the plurality of trips, calculate an optimal cargo load for the trip based on the predicted river level of the waterway at the one or more points along the trip.

The method may further comprise, for each of the plurality of trips, updating the voyage plan in real time based on real-time predictions of the travel time for the trip by the travel time prediction model.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for AI-based waterway information management. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Systems 1.1. Infrastructure

Figure 1:
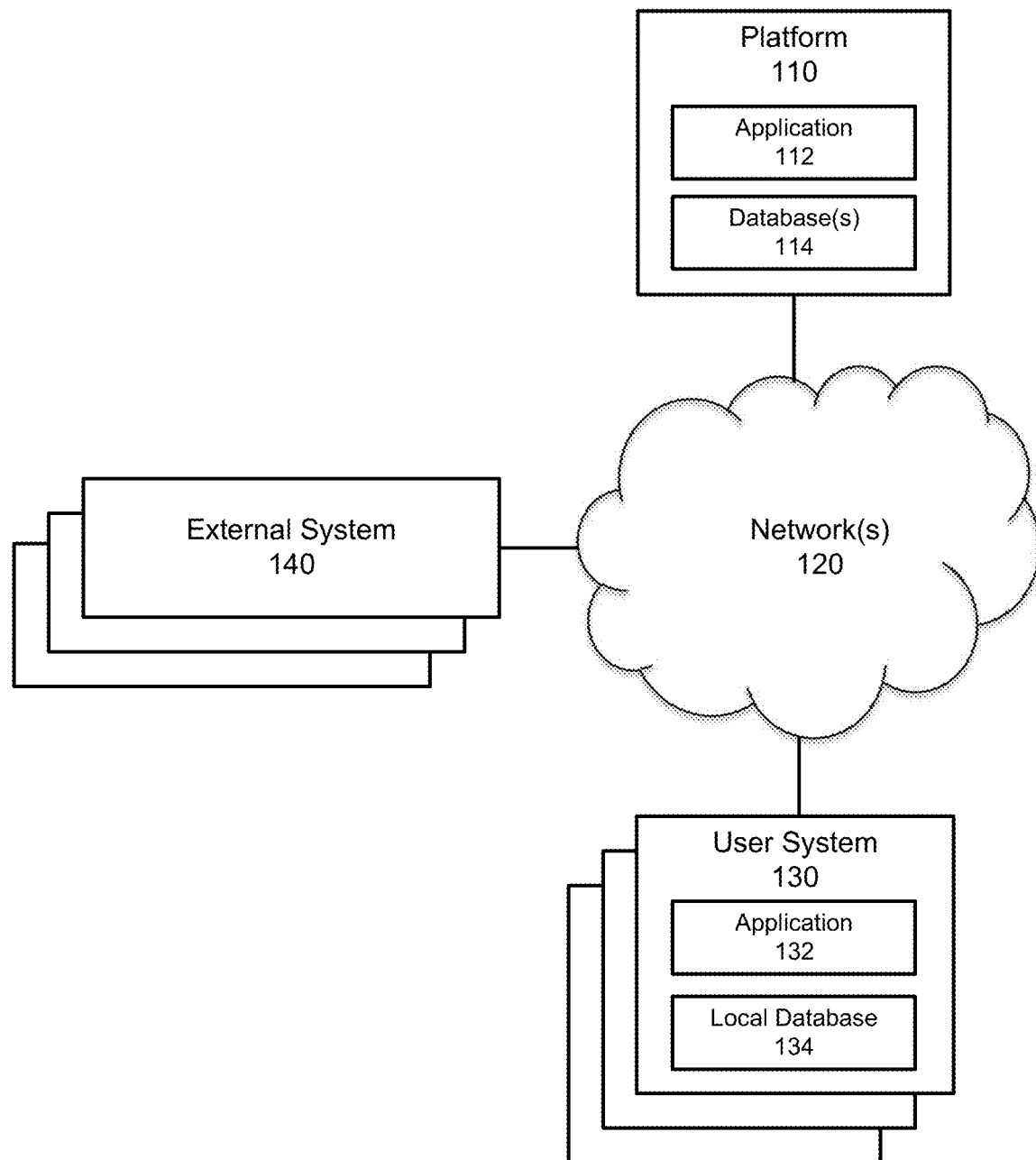
FIG. 1 illustrates an example infrastructure, in which one or more of the processes described herein, may be implemented, according to an embodiment.

FIG. 1 illustrates an example infrastructure in which a waterway management system may operate, according to an embodiment. The infrastructure may comprise a platform 110 (e.g., one or more servers) which hosts and/or executes one or more of the various functions, processes, methods, and/or software modules described herein, including any machine-learning models (training and/or operation) and other artificial intelligence described herein, as well as any data aggregation described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, data feeds or other data sources, etc.) via one or more networks 120.

Network(s) 120 may comprise the Internet, and platform 110 may communicate with user system(s) 130 through the Internet using standard transmission protocols, such as Hypertext Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, navigation systems (e.g., a maritime navigation system on a maritime vessel), televisions, set-top boxes, electronic kiosks, point-of-sale terminals, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and/or the like, including elements comprising or derived from data stored in one or more databases (e.g., database(s) 114) that are locally and/or remotely accessible to platform 110. It should be understood that platform 110 may also respond to other types of requests (e.g., any GET or POST request) from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, including graphical user interfaces, and rely on the web service to implement or otherwise provide the backend processes, methods, functionality, storage, and/or the like, described herein.

For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at user system(s) 130, while the server application on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the functions, processes, or methods of the application described herein.

1.2. Example Processing Device

Figure 2:
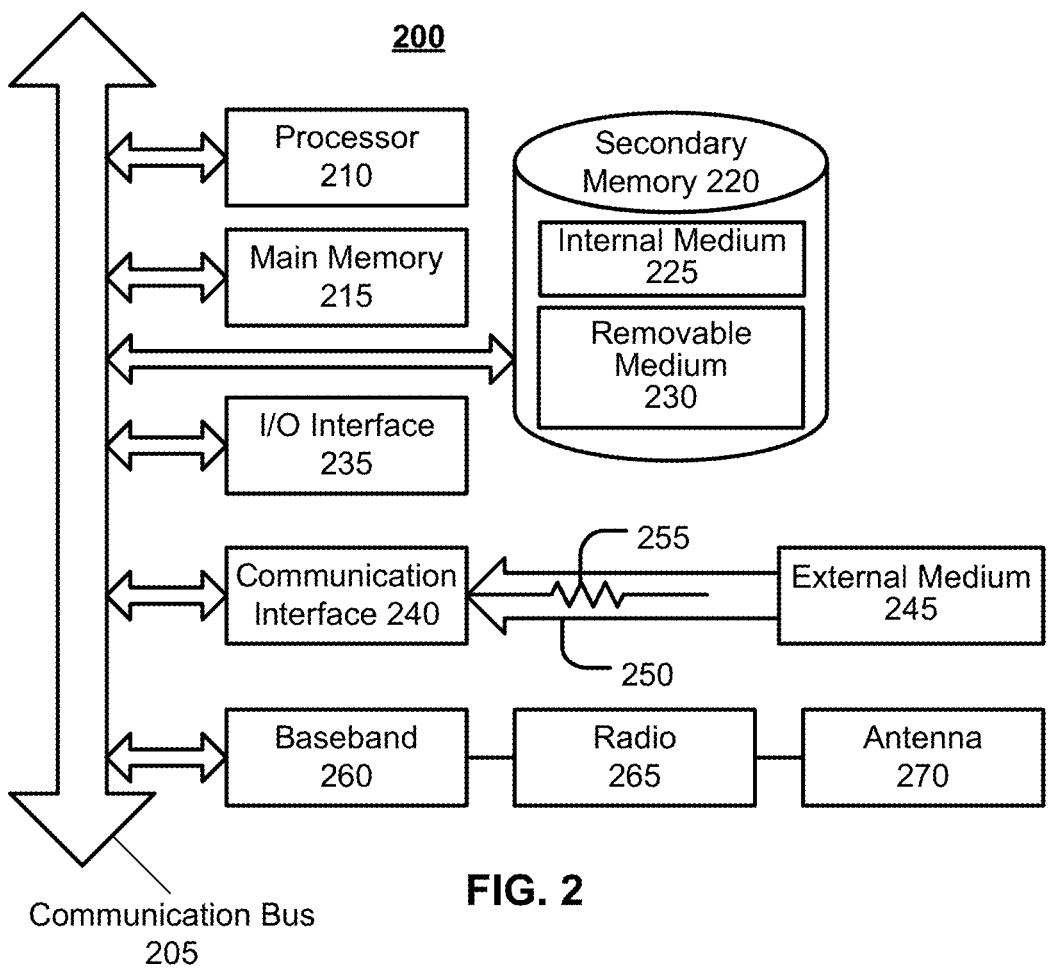
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., disclosed software modules) and/or other data stored thereon. The computer software or data stored on secondary memory 220 is read into main memory 215 for execution by processor 210. Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

2. Processes

Embodiments of processes for AI-based waterway information management will now be described in detail. It should be understood that the described processes may be embodied in one or more software modules that are executed by one or more hardware processors (e.g., processor 210), e.g., as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Overview

Figure 3:
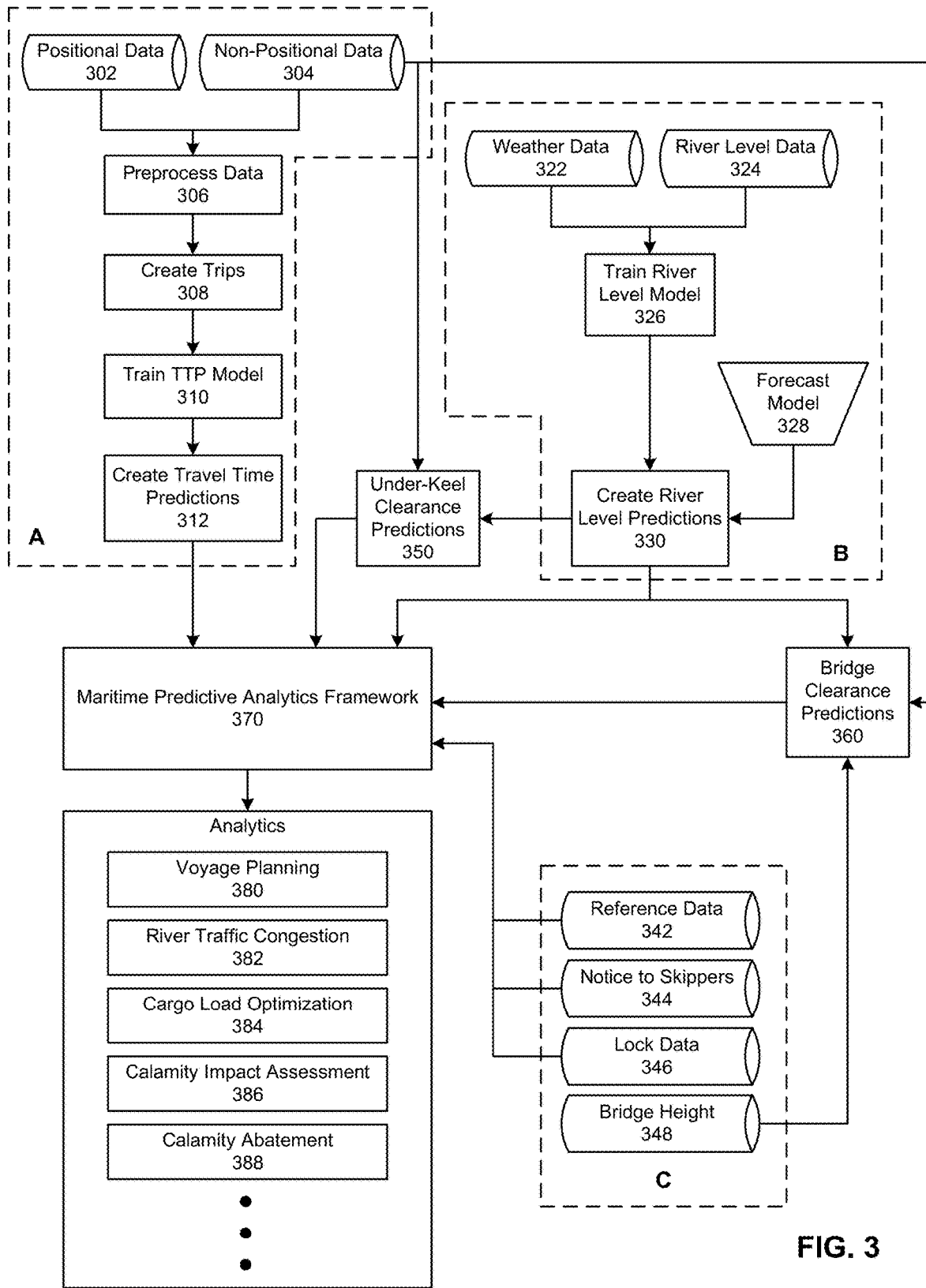
FIG. 3 illustrates an example data flow for AI-based waterway information management, according to an embodiment.

FIG. 3 illustrates an overall data flow for AI-based waterway information management, according to an embodiment. The data flow may be implemented on platform 110, for example, by server application 112, utilizing one or more databases 114 and/or external systems 140 as data sources. In the illustrated embodiment, various input data are initially processed by three processes, labeled A, B, and C.

In process A, a travel time prediction (TTP) model is trained and operated to predict travel times for trips along a waterway (e.g., river or sea). In an embodiment, positional data 302 and non-positional data 304 are pre-processed in subprocess 306, and used to create a training dataset representing a plurality of trips having known travel times and other attributes in subprocess 308. Positional data 302 may comprise, without limitation, for each of a plurality of trips (e.g., historical trips), Global Positioning System (GPS) data representing the route of the trip, Automatic Identification System (AIS) data, manually entered data, and/or the like. Non-positional data 304 may comprise, without limitation, for each of the plurality of trips, vessel data from the Federal Communications Commission (FCC) Universal Licensing Database, vessel characteristics, tow configuration, vessel draft, vessel height, commodity type and/or amount, supply chain transactions, barge type, barge registration number, and/or the like. In subprocess 310, the training dataset is used to train the TTP model to predict travel times for any arbitrary trip along a waterway. In subprocess 312, the trained TTP model is used to predict travel times for specified trips (e.g., a trip planned and specified by a user). In an embodiment, the TTP model comprises a gradient boosting model (GBM). The TTP model may utilize historical travel time estimates that were derived be using a link-based heuristic and AIS data, as described, for example, in DiJoseph et al., "Estimating Vessel Travel Time Statistics for Inland Waterways with Automatic Identification System Data," No. 15-5791 (2015), which is hereby incorporated herein by reference as if set forth in full.

In process B, a river level prediction model is trained and operated to predict river levels at given times. In an embodiment, weather data 322 (e.g., acquired by atmospheric sensors) and river level data 324 (e.g., collected by water level gages or other sensors along waterways) are used as a training dataset to train an environmental or river level prediction model in subprocess 326. The output of the trained river level prediction model may be combined with weather forecasts 328 (e.g., from an external system 140 providing real-time or periodic rainfall or other weather forecasts and environmental parameters, such as soil moisture content, snow melt, etc.) to predict river levels for specified times (e.g., at a starting point, ending point, and/or during a trip planned and specified by a user) in subprocess 330. It should be understood that, as used herein, the noun "real time" or adjective "real-time" do not require simultaneity, and that the term may encompass near real-time or other contemporaneous occurrences that are within seconds of real time, as opposed to tens of minutes or hours after real time. In an embodiment, the river level prediction model comprises a convolutional neural network (CNN).

In process C, data is aggregated. The data may be aggregated from a plurality of different data sources, for example, represented by database(s) 114 and/or external systems 140, into a common data format or framework. The data sources may provide real-time and/or historical data. In an embodiment, the data comprises reference data 342, notices to skippers 344, lock data 346, and/or bridge height data 348. Reference data 342 may comprise data for port facilities and/or waterway facilities, aids to navigation, river mile markers, nautical charts, calamity reports, and/or the like. Notices to skippers 344 may comprise notices to mariners, notices to navigation interests, and/or the like. Lock data 346 may comprise lock queue information, lock status, lock maintenance schedules, and/or the like. Bridge height data 348 comprises the heights of bridges across the waterways.

In an embodiment, the data and output produced by processes A, B, and C are used by a maritime predictive analytics framework 370 to provide predictive analytics, including insights and decision support. For example, non-positional data 304 may be combined with river level predictions from the river level prediction model, created in process B, to produce under keel clearance predictions (e.g., for port facilities) in subprocess 350. In addition, non-positional data 304 may be combined with bridge height data 348 and river level predictions from the river level prediction model, created in process B, to produce bridge clearance predictions in subprocess 360. Travel time predictions output by subprocess 312, river level predictions output by subprocess 330, under-keel clearance predictions output by subprocess 350, bridge clearance predictions output by subprocess 360, reference data 342, notices to skippers 344, lock data 346, and/or other data or outputs may all be input to maritime predictive analytics framework 370 to provide predictive analytics, such as voyage planning 380, river traffic congestion prediction 382, cargo load optimization 384, calamity impact assessment 386, calamity abatement prediction 388, and/or the like. The analytics illustrated in FIG. 3 are merely non-limiting examples, and additional analytics will be described herein. In addition, embodiments can, but do not need to, implement all of the analytics described herein, and an embodiment could include more, fewer, and/or different set of analytics than those described or illustrated herein, including potentially no analytics at all. Collectively, the system provides a maritime predictive analytics framework that be used for any number, variety, and combination of analytics.

2.2. Travel Time Prediction

An embodiment of the travel time prediction model, trained in step 310 and operated in subprocess 312, will now be described in detail. In an embodiment, a machine-learning model is generated to predict travel times (e.g., barge and tow travel times) along one or more inland waterways. The machine-learning model may comprise a gradient boosting model (GBM) that predicts an estimated time of arrival (ETA) for a maritime voyage. In one particular implementation, the gradient boosting model was trained on historical AIS data to predict ETAs with an approximate 26% mean absolute percent error. Accurate ETA prediction has several useful applications in the context of inland waterway systems, including, without limitation, reducing traffic, providing shipping and freight operators with more accurate ETAs, and/or scheduling lock maintenance to alleviate disruptions to waterway industries.

There are 25,000 miles of navigable waterway in the United States, and they carry nearly one-sixth of all cargo moved between cites in the U.S. Barges are an efficient method of moving commodities from city to city. Over 60% of farm exports, 20% of coal, and 22% of petroleum move via the inland waterway system. In 2019, $8.5 billion of total revenue was generated, creating a profit margin of 19% for businesses. All this is to say that transportation via inland waterways is a vital part of the U.S. economy, and knowing exactly when these barges will arrive is crucial to making the entire system more efficient.

The U.S. Army Corps of Engineers (USACE) controls 191 locks, with 237 operational lock chambers, along U.S. inland waterways. From a lock operator's perspective, knowing barge arrival times enables operations to be planned more efficiently and maintenance to be planned at the least disruptive times. From shipping companies' and barge lines' perspectives, knowing barge arrival times enables barge routes to be planned more efficiently and can lower insurance costs. From a port operator's perspective, knowing barge arrival times enables docking berths to be designated and traffic flow to be scheduled more efficiently. Conventional methods of estimating travel times essentially guess the travel times using industry know-how and past experience. Thus, increased accuracy and up-to-date estimates would have a sizable impact on the industry.

In an embodiment, in order to train the machine-learning model for travel time prediction in subprocess 310, relevant data is collected from one or more, and potentially a plurality of disparate, sources. One source of data is the AIS. AIS data is required on most commercial and passenger vessels over three-hundred tons. AIS data for a vessel comprises the vessel's GPS location, speed, heading, and other information, transmitted at regular intervals (e.g., commonly two to ten seconds). In one particular implementation, AIS data was used from ships on the Ohio River in 2020, collected from a live feed and down-sampled to two-minute intervals. This provided a total of approximately 300 million data points. AIS data identify ships using their Maritime Mobile Service Identity (MMSI). However, AIS data do not include reliable information on ship size or destination. Thus, other data sources were used, in tandem with the AIS data, including the FCC Universal Licensing database. Many marine transportation datasets identify ships by their U.S. Coast Guard (USCG) identification numbers. The FCC Universal Licensing database was used to correlate a ship's MMSI with the USCG number. The correlated USCG number was then used as an index to other databases to get specific ship details, such as size and destination. For example, the USCG has a database of ship information, indexed by the USCG number, with data attributes, such as ship names, lengths, widths, draughts, and tonnage. The USACE maintains a system of channels along the waterway. Each channel is approximately one mile long, but the length of the channels can vary due to the presiding district and waterway features. There are approximately 12,000 total channels, with 530 channels on the Ohio River. In one particular implementation, eighteen channels, spanning seventy river miles, were chosen due to their high traffic flow and their exhibition of features that represent the rest of the inland waterway system well. Examples of raw data that were collected from various sources and correlated for ships in the training dataset are depicted in the following table:

| AIS Data | FCC Universal Licensing DB | USCG Master DB |
| --- | --- | --- |
| MMSI | MMSI | USCG number |
| Latitude-longitude | USCG number | Net tonnage |
| Course over ground | General class | Gross tonnage |
| Rate of turn | Special class | Breadth |
| Speed over ground | Ship name | Depth |
| Heading | Ship length | Length |
| Date and time | — | Hull Material |

In one particular implementation, all of the collected and correlated data were stored in a MongoDB database (e.g., database 114) for fast querying. The AIS data were then aggregated to create daily, monthly, and hourly speed averages on the Ohio River to measure and predict traffic more effectively. From the AIS data, trips were formed for each vessel to produce the training dataset to be used to train the TTP model in subprocess 310.

Figure 4:
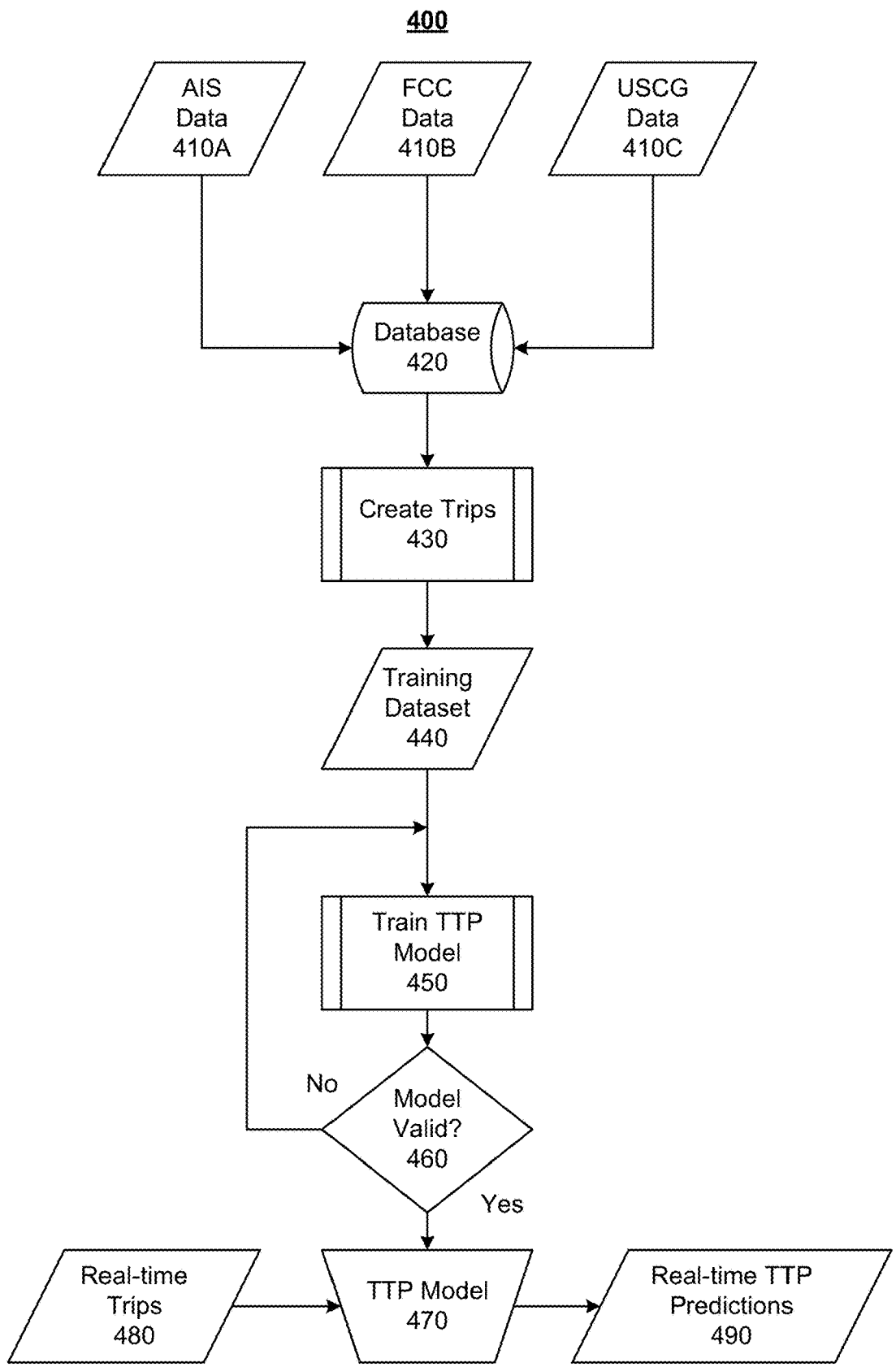
FIG. 4 illustrates an example data flow in process A of FIG. 3, according to an embodiment.

FIG. 4 illustrates a data flow 400 in process A of FIG. 3, according to an embodiment. Initially, relevant data from one or more data sources 410 are accumulated, cleaned, and stored in a database 420 (e.g., in database(s) 114). It should be understood that this data processing corresponds to subprocess 306 in FIG. 3. As discussed above, data sources 410 may comprise AIS data 410A, FCC data 410B, and USCG data 410C. However, it should be understood that more, fewer, and/or different data sources 410 may be used.

AIS data 410A is one example of positional data 302, and FCC data 410B and USCG data 410C are examples of non-positional data 304.

In one particular implementation, the cleaning of the data may comprise removing duplicate rows in FCC data 410B, since some vessels have multiple MMSI and USCG numbers. The de-duplicated FCC data 410B and USCG data 410C can then be correlated using the USCG numbers to get a table with vessel characteristics corresponding to each MMSI.

In the particular implementation, trips were generated for each of eighteen individual channels on the Ohio River. Each trip started in a geofence (e.g., an area defined by GPS coordinates) at either the upstream or downstream border of the channel, and then traversed the channel to a geofence at the opposite border of the channel. These trips were used to train eighteen different models, corresponding to the eighteen different channels. In addition, trips that spanned a plurality of channels were generated to provide results for combinations of two or more of the eighteen channels models. A directional graph network was used to connect the individual channels. The directionality of the graph enabled the adjacent upstream and downstream channels of a given channel to be quickly determined.

In the particular implementation, this table was used with AIS data 410A to create trips in subprocess 430, which may correspond to subprocess 308 in FIG. 3. In an embodiment, the trips, output by subprocess 430, are defined as a series of consecutive AIS messages in AIS data 410A with the following conditions:
(1) the first AIS message must have latitude and longitude coordinates within either the upstream or downstream geofence;
(2) the next AIS message is added to the current trip if either (a) the time interval is less than or equal to the reporting interval or a predefined time period (e.g., five minutes, fifteen minutes, etc.), or (b) the vessel has not moved more than a predefined number of miles (e.g., two miles) from its location in the previous AIS message;
(3) trips end whenever a vessel reaches the opposite geofence; and
(5) trips must comprise more than two AIS messages.

The algorithm below describes the trip creation in subprocess 430, according to an embodiment:

Example Algorithm for Trip Creation
Input: AIS messages
Output: Trips dataset

```
tripTotal ← [ ];
for mmsi ← unique mmsi do
    df ← all ais messages with mmsi;
    N ← length (df);
    sort df by datetime;
    tripCurrent ← [ ];
    for i=0 to N-1 do
        if (tripCurrent.isempty) then
            if (df[i].latlong within upstream geofence) then
                upstream = False;
            if (df[i].latlong within downstream geofence) then
                upstream = True;
        timeDiff ← df[i].datetime-df[i+1].datetime;
        distance ← (df[i].latlong-df[i+1].latlong).miles;
        if(timeDiff<=15 minutes and distance < 2 miles) then
            append df[i] to tripCurrent;
        else if length(tripCurrent)>2 then
            if (upstream is True and df[i].latlong within upstream
                geofence) then
```

```
Example Algorithm for Trip Creation
    Input: AIS messages
    Output: Trips dataset append tripCurrent to tripTotal;
        if (upstream is False and df[i].latlong within
        downstream geofence) then
            append tripCurrent to tripTotal;
        end
        tripCurrent ← [ ];
        append df[i] to tripCurrent;
    end
  end
end
```

The resulting trips, created in subprocess 430, are used as a training dataset 440, which may be split into training, validation, and testing subsets. For example, 70% of the trips can be used in a training subset, 15% of the trips can be used in a testing subset, and during training, 15% of the trips can be used in a validation subset. Each trip in training dataset 440 may be represented by the start time of the trip, the day and month of the trip, the gross tonnage of the trip, the net tonnage of the trip, the length of the vessel performing the trip, the breadth of the vessel performing the trip, the depth of the vessel performing the trip, whether the trip is upstream or downstream, the number of ships in the channel at the time, and/or the like. Other data may be calculated from source data 410 and added to each trip in dataset 440 by subprocess 430.

In addition, statistical features may be calculated from source data 410 and used in dataset 440. For example, the average speed and standard deviation by month, weekday, hour, and/or day of year may be calculated based on AIS data 410A. This enables the capture of one or more environmental factors, as well as general traffic trends. Both of these are important factors in travel time predictions. For instance, traffic conditions can vary under different weather patterns, which can affect travel times.

Figure 5:
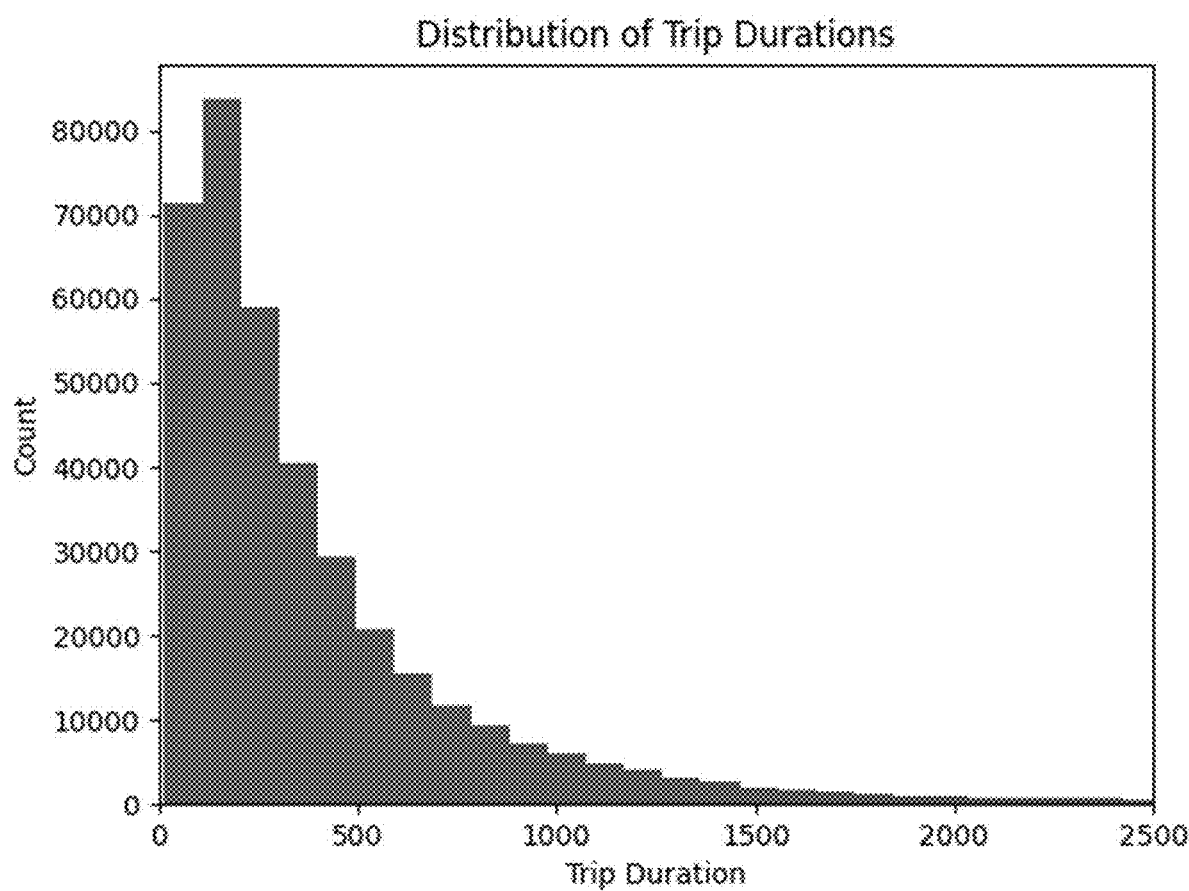
FIG. 5 illustrates statistical details of an example training dataset, according to an embodiment.

FIG. 5 illustrates an example distribution of trip durations of multi-channel trips created by subprocess 430, according to a particular implementation of an embodiment. The average trip duration was approximately three-hundred-and-thirty-three minutes. Not surprisingly, the trip duration increased as the trip distance increased, and upstream trips were generally slower than downstream trips.

The trips created by subprocess 430 contained outliers. In an embodiment, subprocess 430 may remove at least some of these outliers, based on at least trip durations and trip distances, such that these outliers are not included in dataset 440. In particular, outlying trips that do not make spatial and/or temporal sense may be removed from the data. For example, there may be some trips with long distances but unreasonably short durations. This can indicate erroneous AIS data 410A (e.g., erroneous messages in AIS data 410A), which is a common problem with AIS data 410A. Thus, the identification of trips with outlying length-to-duration relationships can help in the detection of anomalous or incorrect AIS data 410A, such that this data is not carried forward into dataset 440. In addition, outlying trips that are not helpful for training may also be removed from the data. For example, there may be some trips with long durations but unreasonably short distances. These can be assumed to be helper vessels that generally stay in one place, travel at very slow speeds, and do not travel long distances along the waterway. Although these trips make physical sense, they are not generally helpful to travel time prediction, and therefore, may be excluded from dataset 440. In summary, any trips that exhibit a ratio of distance to duration that is less than or equal to a predefined lower threshold (e.g., indicative of a helper vessel) and/or greater than or equal to a predefined upper threshold (e.g., representing a speed that is greater than the maximum speed of a maritime vessel, thereby indicating erroneous data), or a ratio of duration to distance that is less than or equal to a predefined lower threshold (e.g., indicative of erroneous data) and/or greater than or equal to a predefined upper threshold (e.g., indicative of a helper vessel), may be excluded from dataset 440. It should be understood that the lower and upper thresholds define a range, and ratios between distance and duration that are outside this range indicate outlying data that is either erroneous or unhelpful. In a particular implementation, trips of less than two minutes (i.e., too short to be legitimate) or greater than one-thousand minutes (i.e., over the 75th percentile in terms of trip duration) were excluded as outliers.

Training dataset 440 was then used to train the TTP model in subprocess 450, which corresponds to subprocess 310 in FIG. 3. The trained TTP model was then evaluated in subprocess 460. For example, a ten-fold cross-validation may be applied using various error metrics, such as mean absolute error (MAE), mean absolute percentage error (MAPE), and/or root mean squared error (RMSE). Using the evaluation scores, the model can be fine-tuned to get a final, validated TTP model 470. TTP model 470 may then be deployed to receive real-time trips 480 as input, and produce real-time predictions of travel time 490 as output.

Tree-based ensemble learning has proved to be effective in solving classification and regression problems, relative to other supervised learning algorithms, such as support vector machines and feed-forward neural networks. See "An empirical comparison of supervised learning algorithms," by Caruana et al., Proceedings of the 23rd Int'l Conference on Machine Learning (2006), pp. 161-8, which is hereby incorporated herein by reference as if set forth in full. This is because ensemble learning strategically utilizes multiple simple models to optimize the predictive power of the ensemble. In addition to its predictive power, ensemble learning has good interpretability, which is important for understanding the underlying variables and features of the problem being solved. This can be crucial in making informed decisions and analyzing factors that affect traffic and travel time.

Furthermore, gradient boosting models (GBMs) have attractive properties that give them advantages over other machine-learning models. For example, GBMs have efficient variable selection and can accept predictor variables of many types (e.g., categorical, quantitative, etc.). See "A working guide to boosted regression trees," by Elith et al., Journal of Animal Ecology, vol. 77, iss. 4 (2008), pp. 802-13, which is hereby incorporated herein by reference as if set forth in full. GBMs are also insensitive to outliers and can fit complex data distributions, which is advantageous since real-life data often embodies non-linear relationships. GBMs have been shown to outperform random forests, as well as ARIMA models in the context of freeway travel time prediction. See "A gradient boosting method to improve travel time prediction," by Zhang et al., Transportation Research Part C: Emerging Technologies 58 (2015), pp. 308-24, doi:10/1016/j.trc.2015.02.019, which is hereby incorporated herein by reference as if set forth in full.

GBMs also have disadvantages. For example, the high performance of GBMs is due to the vast number of parameters, which can be difficult to optimize. Tree depth, learning rate, and number of features are some of the parameters that need to be carefully tuned to achieve high predictive power. GBMs can also be easily overfitted, since they are trained to minimize a cost function. However, many of these disadvantages can be solved using model optimization techniques, such as cross validation and grid search.

In an embodiment, TTP model 470 comprises the XGBoost model, which is a variant of GBM. XGBoost provides scalability and state-of-the-art performance across multiple domains. See "XGBoost: A Scalable Tree Boosting System," by Chen et al., Proceedings of the 22nd ACM SIGKDD Int'l Conference on Knowledge Discovery and Data Mining, Association for Computing Machinery (2016), pp. 785-94, doi:10.1145/2939672.2939785, which is hereby incorporated herein by reference as if set forth in full. For a given dataset D with n examples and m features, where D={$(x_i, y_i)$}, (|D|=n, $x_i \in \mathbb{R}^m$, $y_i \in \mathbb{R}$), a basic tree ensemble method adds together K tree functions to make a final prediction output ŷ:

$$\hat{y}_i = \phi(x_i) = \sum_{k=1}^{K} f_k(x_i), f_k \in \mathcal{F}$$

wherein $\mathcal{F}$ is the space of regression trees $f_k$:

$$\mathcal{F} = \{f(x) = w_{q(x)}\}(q:\mathbb{R}^m \to T, w \in \mathbb{R}^T)$$

wherein q is the tree mapping to a leaf index, with T number of leaves and leaf weights w.

In an embodiment, in order to create the set of functions needed for the model, the following regularized cost function is minimized:

$$\mathcal{L}(\phi) = \sum_i l(\hat{y}_i, y_i) + \sum_k \Omega(f_k)$$

wherein $$\Omega(f) = \gamma T + \frac{1}{2}\lambda \|w\|^2$$

The convex loss function, represented by l, calculates the difference between the target and predicted values. The regularization term, represented by Ω, was created to keep TTP model 470 simple and prevent an overlying complex tree system. This is part of what differentiates XGBoost from other GBMs. XGBoost models are trained in an additive fashion, as opposed to the typical methods of optimization used for other models in Euclidean space. XGBoost uses functions as parameters, and these functions are chosen according to whichever function most improves the XGBoost model when added.

TTP model 470 may also comprise additional regularization methods that prevent overfitting of training dataset 440. For example, each new weight that is added to the trees of TTP model 470 may be reduced by a factor, similar to how stochastic optimizers use a learning rate. Column subsampling may also be used, since it is more effective than row sub-sampling and also decreases the necessary computation time, which is a large benefit to TTP model 470.

In an embodiment, subprocess 450 may comprise finding the best splitting algorithm (i.e., deciding where to split the trees to create the best model). This can be difficult to do over the space of all features. Thus, the features may be ranked by importance for the splitting algorithm. In order for the data to fit in memory, an approximate splitting method may be used instead of an exact splitting method. An approximate splitting method splits the trees according to a weighted quantile sketch. XGBoost uses an algorithm that is designed to be aware of sparsity in the data when splitting. This algorithm recognizes missing data and corrects the splitting process accordingly, thereby greatly improving performance over the basic algorithm.

In an embodiment, a random search, instead of the traditional grid search, was utilized to fine tune the XGBoost model (e.g., optimize hyperparameters) of TTP model 470. In the traditional grid search, a model is built and evaluated for every combination of parameters, and the best performing model is kept. The required time and computational power increase exponentially as the number of parameters that need to be tuned increases. Although this exhaustive search may result in the best model, it is highly inefficient and impractical. In a random search, a random combination of parameters is used to train the model. One benefit of the random search is that efficiency does not decrease when adding parameters that do not influence the performance. Advantageously, a random search produces equivalent predictive performance as the traditional grid search, but at a lower computational cost. Due to the large space of parameter values in the XGBoost model, a random search was better suited to finding the optimal parameters.

The table below shows the various parameters used in the optimization process and the range of values that were searched to produce the XGBoost model of TTP model 470, in one example implementation:

| Parameter | Range |
| --- | --- |
| gamma | 1-100 |
| learning_rate | 0.005-0.05 |
| max_depth | 5-10 |
| colsample_bytree | 0.7-1 |
| subsample | 0.5-1 |
| reg_alpha | 1-20 |
| reg_lambda | 1-20 |

Figure 6:
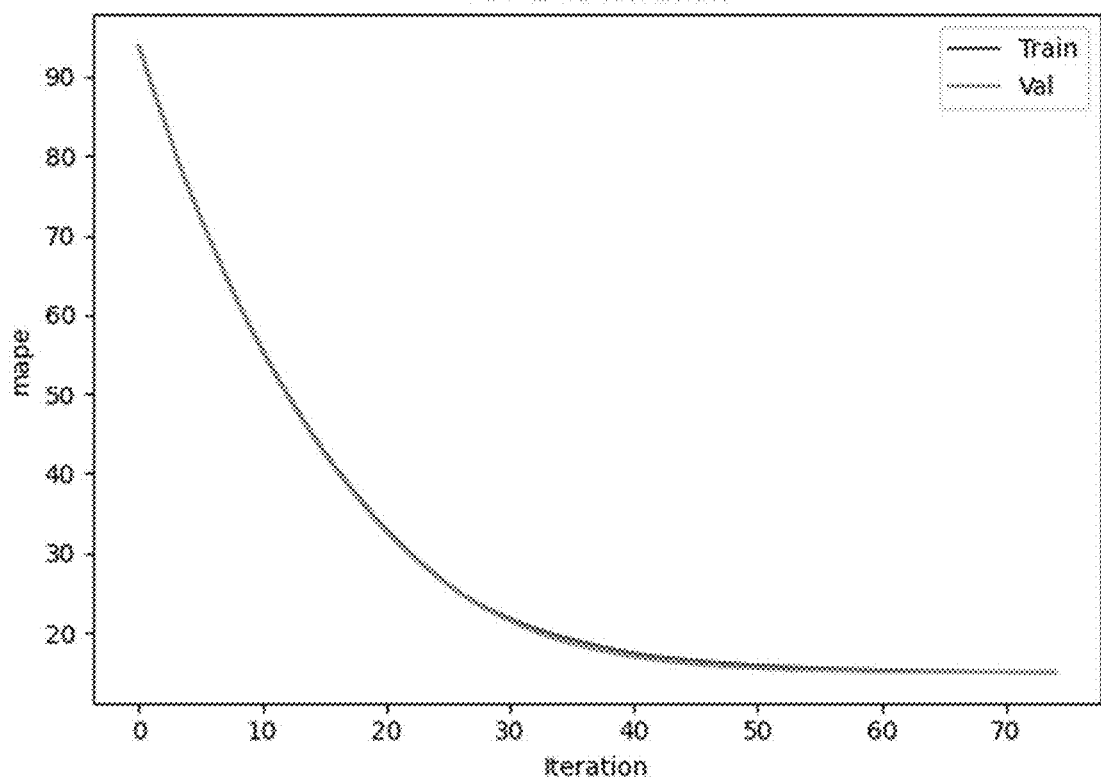
FIG. 6 illustrates a plot of error for an example training process, according to an embodiment.

Since some parameters are more influential than others, firstly, a random search was applied, and then secondly, a regular grid search was used on the important parameters found by the random search. For instance, one of the parameters was the learning rate (i.e., represented as "learning rate"), which reduces the feature weights after each step, thereby making the model more robust and less susceptible to overfitting. FIG. 6 shows the MAPE of training and validation subsets of dataset 440 at various iterations for a particular channel. As shown, the validation curve closely follows the training curve, indicating that the model performs well and ensuring that the model is not overfitted or underfitted. The validation error was lowest when the learning rate was 0.5, which is therefore, the optimal value. At values of the learning rate that were greater than 0.5, the model overfit due to the increasing difference between the validation and training errors. Conversely, at values of the learning rate that were less than 0.5, the model underfit, as demonstrated by the significantly higher validation and training errors. By fine tuning the XGBoost model after the random search, the model can be further optimized, and the errors can be reduced.

In an embodiment of subprocess 460, TTP model 470 may be evaluated using one or more of the following error metrics:

Root mean squared error (RMSE):

$$RMSE = \sqrt{\frac{1}{n}\sum_{i=1}^{n}e_i^2}$$

Mean absolute error (MAE):

$$MAE = \frac{1}{n}\sum_{i=1}^{n}|e_i|$$

Mean absolute percentage error (MAPE):

$$MAPE = \frac{100\%}{n}\sum_{i=1}^{n}\left|\frac{e_i}{y_i}\right|$$

$R^2$ Score:

$$R^2 = 1 - \frac{g_{total}}{g_{error}}$$

$$g_{total} = \sum_{i=1}^{n}(\overline{y_i} - y_i)^2$$

$$g_{error} = \sum_{i=1}^{n}e_i^2$$

In the above metrics, $e_i = \hat{y}_i - y_i$ is the residual error, $\hat{y}_i$ is the predicted score, $\overline{y}_i$ is the true average, and n is the total number of samples. In a particular implementation of a TTP model 470 to predict barge travel times on a channel of the Ohio River, a random search was performed with a ten-fold cross-validation to train and fine tune each of the eighteen channel models. The models were then evaluated using the testing subset of dataset 440 to obtain the final error scores. The criteria for the best model during cross-validation was based on the lowest MAPE score.

In an embodiment, MAPE was chosen as the most important error metric due to the wide range of possible predicted output times. The durations of trips can range from a short ten minutes to hours to a day to multiple days. Utilizing an error in minutes with the most common error metrics (e.g., MAE) will effectively weight longer trips as having larger errors. MAPE, on the other hand, treats all trips the same. In other words, the error in minutes is proportional to the length of the trip. For instance, a long trip of 10 hours with an error of 100 minutes is equivalent to a short trip of 30 minutes with an error of 5 minutes. Intuitively, this makes sense and is the reason that MAPE was chosen as the primary error metric for training in subprocess 450. However, MAE was still used when evaluating TTP model 470 in subprocess 460.

After a model is trained for each channel, a prediction can be made for a multi-channel trip by combining the predictions of individual channel models. The algorithm below describes a process for model prediction, according to an embodiment:

Example Algorithm for Model Prediction
Input: Start channel, end channel, start datetime
Output: A travel time prediction path ← find the path from start_channel to end_channel using the channel graph network;
final_datetime ← start_ datetime;
for channel ← path do
   channel_model ← load the corresponding model for that channel;
   trip ← fetch the trip data stored in the database based on channel and final_datetime;
   channel_prediction ← get a prediction from channel_model using the trip data;
   final_datetime ← final_datetime + prediction;
end
prediction ← final_datetime − start_datetime;

The table below depicts the error values for 10,000 multi-channel trips from dataset 440, according to a particular implementation:

| Metric | Error Value |
| --- | --- |
| MAE | 109.18 minutes |
| MAPE | 26.18% |

The final TTP model 470 in this particular implementation produced a MAPE of 26.18% with an MAE of 109.18 minutes. This means that, on average, the ETA predicted by TTP model 470 was off by about 26% from the actual ETA. The variance of the durations of trips in training dataset 440 spanned from ten minutes to a couple days. A huge variance in a predictor variable can cause a wide spread in residuals, resulting in a high MAE, since it can be harder for the model to fit training dataset 440. However, the final TTP model 470 performed relatively well, as demonstrated by the MAPE score.

The table below depicts the error values for a sample of multi-channel trips, according to a particular implementation:

| Start channel | End channel | MAE | MAPE | Stream | Length (# of channel reaches) |
| --- | --- | --- | --- | --- | --- |
| CELRL_OH_LD_OLM_7 | CELRL_OH_LD_OLM_3 | 25.10 | 13.52 | Downstream | 5 |
| CELRL_OH_LD_OLM_1 | CELRL_OH_LD_OLM_4 | 27.52 | 15.29 | Upstream | 4 |
| CELRL_OH_LD_CAI_1 | CELRL_OH_LD_OLM_10 | 109.78 | 16.82 | Upstream | 14 |
| CELRL_OH_LD_OLM_6 | CELRL_OH_LD_OLM_4 | 40.30 | 17.61 | Downstream | 3 |
| CELRL_OH_LD_SMT_2 | CELRL_OH_LD_CAI_2 | 114.33 | 16.42 | Downstream | 17 |

In the particular implementation, the final TTP model 470 performed well at predicting short trips, due to fewer environmental factors and variables for which the models did not account (e.g., lockage wait times). The performance of the final TTP model 470 may also depend on how well each individual channel model is trained.

Figure 7:
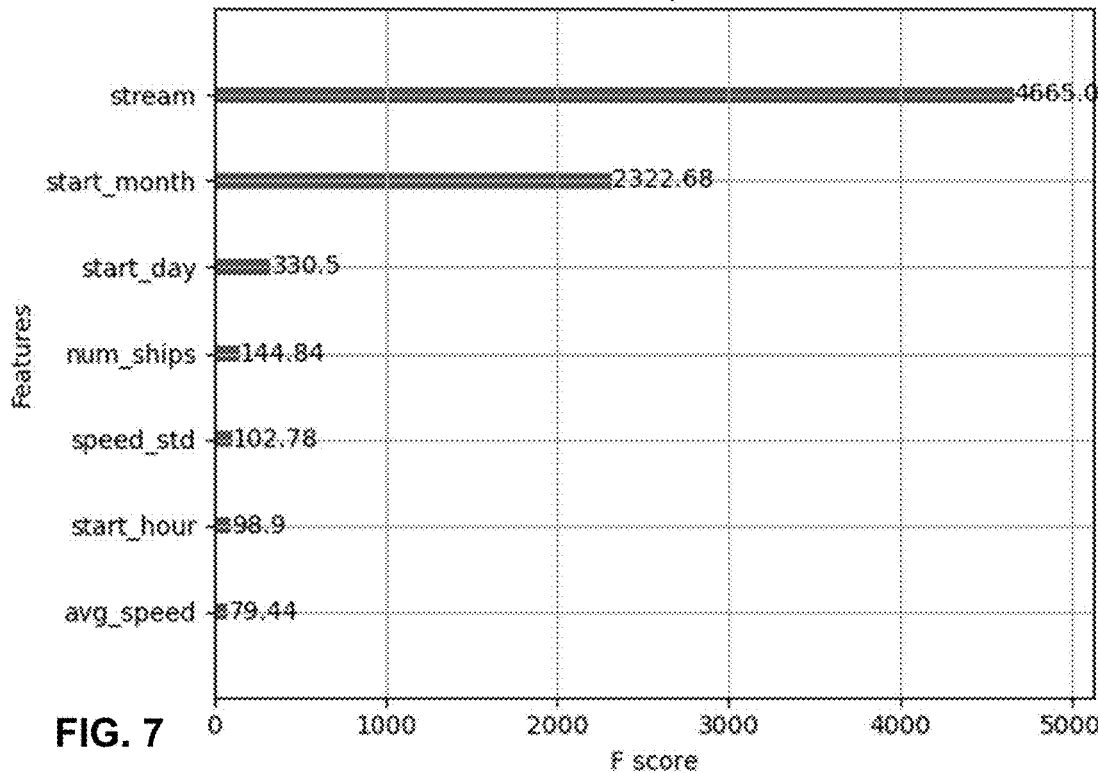
FIG. 7 illustrates a plot of features and their importance for an example AI model, according to an embodiment.

FIG. 7 illustrates a plot of the top seven features and their importance for a particular channel, according to a particular implementation of an embodiment. As shown, the stream (i.e., whether the trip was upstream or downstream) was the most important feature, followed by the start month (the month of the trip) and the start day (the day of the trip). The direction of the trip is important, because environmental conditions are different depending on whether the trip is upstream or downstream. Generally, a vessel can travel faster if the trip is downstream, since the vessel is going with the flow of the river. Although a multitude of speed features were used, it makes sense that the time of the trip was more important, since most traffic follows a weekly pattern. For example, there is generally less traffic on weekends and more traffic on weekdays.

In an embodiment, TTP model 470 may also be trained and operate on environmental data. For example, weather conditions and water levels can have a tremendous impact on travel times. Additionally or alternatively, TTP model 470 may be trained and operate on additional vessel-specific data (e.g., in addition to size, weights, and/or other dimensions) that is correlated and associated with the trips in subprocess 430. For example, such vessel-specific data may comprise the specific commodities being carried by the vessel (e.g., barge), the tow layout for barges, and/or the like. TTP model 470 could also comprise or incorporate a machine-learning model that can predict the travel time for going through locks and/or dams.

In summary, in an embodiment, a TTP model 470 is trained and operated to predict travel times for vessels (e.g., barges) on inland waterways using GBM with regression trees. TTP model 470 may comprise one or a plurality of models (e.g., a separate model for each channel in an inland waterway being modeled). In a particular implementation, by extracting relevant data 410 and building trip dataset 440 in an effective manner, the final TTP model 470 was trained to predict estimated times of arrival unexpectedly well, with a MAPE of 26%. The most influential features that affected trips were identified, and were mostly based on the distance the vessel traveled and whether it was going upstream or downstream. Accurate travel time prediction is crucial for a variety of stakeholders in the inland waterway transportation industry. For example, it can benefit ports and locks by enabling them to better schedule maintenance and traffic flow, and can benefit shipping companies by providing up-to-date estimates of arrival times for shipments. The travel time predictions can be further improved by incorporating environmental data, which can provide insight as to how fast a vessel can travel and reduce prediction error across the board.

2.3. River Level Prediction

An embodiment of the river level model, trained in subprocess 326 and operated in subprocess 330, will now be described in detail. Accurate river stage forecasts can provide crucial information to operators of vessels (e.g., barges and tow boats), port terminal captains, lock management officials, and/or the like. Shallow river levels (e.g., resulting from prolonged drought) can impact the loading capacity of vessels. Conversely, high river levels (e.g., resulting from excessive rainfall or snowmelt) allow for greater loading capacities, but increase the risk of downstream transportation and lock management. Current river height prediction systems generally limit their analysis to a single station or river basin and often require excessive computational power that prevents up-to-the-minute (e.g., real-time) projections.

In an embodiment, the river level model comprises a convolutional neural network (CNN) that predicts river levels using one or more data sources, such as water gage data from the U.S. Geological Survey and airport weather data reported through the Meteorological Terminal Aviation Routine Weather Report (METAR). In one particular implementation, the Keras Python library was used to build the river level model. The CNN may be built and tuned for stations along inland waterways, and may be evaluated for predictive error using RMSE.

Extreme weather events, such as heavy rainfall or drought, result in changes to the local water balance for the affected area. These water balance changes may be manifested in multiple ways, including through changes in discharge along surface streams and rivers. Discharge is a function of flow velocity and cross-sectional flow area, and depends on local conditions. Hydrologically, discharge is an important variable, since it allows scientists to reconcile local water budgets using a volume-per-unit-time approach. In practical applications, river levels (also referred to as "river stages" or "river heights") provide more pertinent information, since they allow for the communication of water levels in a familiar measurement unit. This is especially true in domains, such as the water transportation industry, in which contact between a barge and river bottom can cause serious damage to the barge and, depending on the material being transported, to the surrounding ecosystem.

Because precipitation is a major component of the local water balance input, river levels respond to local weather events, such as heavy rainfall and drought. However, these phenomena do not register on river level sensors instantaneously. Hydrologic lag is the time delay between a weather event and the river level response. This hydrologic lag can vary depending on the location, shape, and size of the drainage basin, previous weather conditions, levees, and/or other parameters of the environment. Hydrologic lag is difficult to calculate and predict due to the many parameters that affect drainage, but is an important consideration for both the water industry and for determining flooding extents during high water events. A common method for determining hydrologic lag is autocorrelation analysis. See "Quantitative Estimation of Causality and Predictive Modeling for Precipitation Observation Sites and River Gage Sensors," by Nguyen, master's thesis, Louisiana State University (2017), which is hereby incorporated herein by reference as if set forth in full. The hydrologic lag plays an important role in the inland transportation industry, since profit is only maximized when barges are filled to maximum capacity. More accurate river level predictions across an entire trip would allow operators to better understand the maximum amount of cargo that can be towed. In addition, uncertainty information is important to the barge industry, since a four-inch variation, in the lowest possible river level experienced during a voyage, can change loading capacity by as much as 68 tons per barge.

Hydrologically naïve machine-learning techniques may show promise for efficient prediction of river level. With the proliferation of inter-networked sensors and Internet of Thing (IoT) technology, the number of measurement stations in U.S. inland waterways is expected to increase. With quick-return measurement stations, machine-learning models have an apparent advantage in scalability over empirical models, which often require hours to make projections. In other words, machine-learning models have an advantage in scenarios in which frequent updates are necessary or desired.

Notably, machine-learning models often perform better than dedicated forecasting platforms when frequently updated forecasts are important.

There are three main approaches to addressing river forecasting problems. The first approach invokes traditional statistical and time-series based techniques, such as the autoregressive moving average (ARMA) model family, copulas, and regressions. For example, autoregressive models have been chained to generate network predictions for the Fraser River. See "Adaptive Parameter-Estimation for Multisite Hydrologic Forecasting," by Awwad et al., J. Hydraul. Eng.-ASCE, vol. 118, iss. 9 (1992), pp. 1201-21, which is hereby incorporated herein by reference as if set forth in full. Statistical copulas have been implemented to demonstrate abnormalities in Upper Rhine River catchment behavior. See "Investigation of Hydrological Time Series Using Copulas for Detecting Catchment Characteristics and Anthropogenic Impacts," by Sugimoto et al., Hydrol. Earth Syst. Sci., 20 (2016), pp. 2705-20, which is hereby incorporated herein by reference as if set forth in full. Regressive techniques, such as lasso regression and support vector regression, have been used to predict daily river levels along the Mekong River with a mean absolute error of less than 0.5 meters, thereby improving upon government standards for flood prediction systems. See "Forecasting Time Series Water Levels on Mekong Rover Using Machine Learning Models," by Nguyen et al., 2015 7th Int'l Conference on Knowledge and Systems Eng. (2015), pp. 292-7, which is hereby incorporated herein by reference as if set forth in full.

The second approach for river forecasting involves standard multilayer perceptron (MLP) neural networks. MLP networks are among the simplest neural networks to implement, and are capable of providing very accurate results. MLP networks are able to reduce error over naïve predictions, multiple linear regression, and periodic ARMA models for monthly river flow predictions. See "River Flow Forecast for Reservoir Management through Neural Networks," by Baratti et al., Neurocomputing 55(3) (2003), pp. 421-37, "Estimation of Dam Reservoir Volume Fluctuations Using Artificial Neural Network and Support Vector Regression," by Une et al., J. Eng. Res., 1(3) (2013), pp. 53-74, and "River Flow Forecasting with Constructive Neural Network," by Valença et al., Lect. Notes in Computer Science, vol. 3809 (2005), pp. 1031-36, which are all hereby incorporated herein by reference as if set forth in full. MLP networks can also predict daily discharge, with an adjusted $R^2$ score of approximately 0.68 and an average RMSE of 0.11 meters. See "Assessment of Short Term Rainfall and Stream Flows in South Australia," by Kamruzzaman et al., Water 6(11) (2014), pp. 3528-54, and "Neural Network Model for Discharge and Water-Level Prediction for Ramganga River Catchment of Ganga Basin, India," by Khan et al., Hydrolog. Sci. J., vol. 61, iss. 11 (2016), pp. 2084-95, which are both hereby incorporated herein by reference as if set forth in full. However, MLP networks are less successful in providing hourly predictions, with time spans longer than three hours being especially error-prone. See "Hourly Water Level Forecasting at Tributary Affected by Main River Condition," by Sung et al., Water 9(9) (2017), 664, which is hereby incorporated herein by reference as if set forth in full.

The third approach uses advanced neural networks, such as recurrent neural networks (RNNs) and wavelet neural networks (WANNs), which can reduce errors produced by MLP networks by as much as 66%. See "Reinforced Recurrent Neural Networks for Multi-Step-Ahead Flood Forecasts," Chen et al., J. Hydrol. 497 (2013), pp. 71-9, which is hereby incorporated herein by reference as if set forth in full. RNNs improve on MLP networks by building a time-dependent input sequence based on recent sensor observations. This input sequence preserves autocorrelations between recent readings, and allows the neural network to investigate time-dependent relationships between variables. RNNs have been developed for single-point stations in Taiwan and the U.S., as well as flood forecasting in Vietnam. See "Real-Time Multi-Step-Ahead Water Level Forecasting by Recurrent Neural Networks for Urban Flood Control," by Chang et al., J. Hydrol. 517 (2014), pp. 836-46, Chen et al., "Online Multistep-Ahead Inundation Depth Forecasts by Recurrent NARX Networks," by Shen et al., Hydrol. Earth Syst. Sci. 17(3) (2013), pp. 935-45, "Echo State Networks as an Alternative to Traditional Artificial Neural Networks in Rainfall-Runoff Modeling," by de Vos, Hydrol. Earth Syst. Sci. 17(1) (2013), pp. 253-67, and "Application of Long Short-Term Memory (LSTM) Neural Networks for Flood Forecasting," by Le et al., Water vol. 11, iss. 7 (2019), pp. 1387-1406, which are all hereby incorporated herein by reference as if set forth in full. Wavelet neural networks have been implemented in South Korea for daily river level prediction, and are effective when combined with other machine-learning algorithms, such as the genetic algorithm. See "River Stage Modeling by Combining Maximal Overlap Discrete Wavelet Transform, Support Vector Machines and Genetic Algorithm," by Seo et al., Water vol. 9, iss. 7 (2017), doi:10.3390/w9070525, and "River Stage Forecasting Using Wavelet Packet Decomposition and Machine Learning Models," by Seo et al., Water Resources Management 30(11) (2016), pp. 4011-35, doi:10.1007/s11269-016-1409-4, which are both hereby incorporated herein by reference as if set forth in full.

In a different approach, a convolutional neural network may be employed. See "Urban Water Flow and Water Level Prediction Based on Deep Learning," by Assem et al., Joint European Conference on Machine Learning and Knowledge Discovery in Databases (2017), pp. 317-29, which is hereby incorporated herein by reference as if set forth in full. This approach employs an architecture with two dimensions—parameter and time—to predict daily river level at river stations. However, the exact methodology does not work with available data, since runoff is a required variable, but is not often available at river stations, let alone in real time. Thus, in an embodiment, a convolutional neural network is employed to predict river levels using river levels readings (e.g., from sensors such as water gages) and weather data (e.g., indicating atmospheric conditions). In an embodiment, the predictions may be made using only these river level readings and weather data.

The United States Geological Survey (USGS) maintains a network of over 1.6 million water data sensors along the U.S. waterway system, including streams, lakes, tunnels, points, and the like. Of these sensors, 108 sensors report river levels of major rivers in the inland waterway system at temporal resolutions that do not exceed one hour and with a sufficient period of record for analysis. In one particular implementation, the major rivers were defined as the Arkansas, Illinois, Mississippi, Missouri, Monongahela, and Ohio Rivers, due to their importance to the shipping industry.

Sensor data from the USGS is available through a Representational State Transfer (REST) API and returned via JSON. Thus, in one particular implementation, a Python™ script was written to convert the JSON objects in responses from the USGS API into a Pandas DataFrame object. This Pandas DataFrame object was written into a local database (e.g., database 114) to be used in a training dataset. It should be understood that this data collection may be performed by server application 112.

The number of observations for each sensor in the USGS sensor data varies by station and depends on temporal resolution and the period of record. Most of the 108 sensors that report river levels do so at fifteen-minute intervals, while some only report river levels at one-hour intervals. In one particular implementation, sensor data that were used for the training dataset began at the most recent of the period of record and Jan. 1, 2009, and ended on Dec. 31, 2018. However, it should be understood that new sensor data is continually added to the USGS database, and that different time ranges of data may be used for the training dataset. In the particular implementation, a sensor that reported at fifteen-minute intervals would produce 350,592 total observations.

The Meteorological Terminal Aviation Routine Weather Report (METAR) provides hourly weather observations from sensors at airports across the U.S. The regional climate centers of the National Oceanic and Atmospheric Administration (NOAA) collect and provide this data using a REST API. Thus, in the particular implementation, METAR data was collected (e.g., by server application 112) from airports (e.g., 79 airports) near the inland waterway system. As with the river-level sensor data, a Python™ script can convert the JSON response from the METAR API into a Pandas DataFrame object, and the Pandas DataFrame objects can be stored in a local database (e.g., database 114).

In an embodiment, prior to generation of the machine-learning model for predicting river level, the river level data (e.g., from the USGS) and weather data (e.g., from the METAR) may be combined and organized into a particular layout. The particular layout can be chosen based on the library (e.g., Keras™) used to produce the machine-learning model. Each sensor or measurement station that reports river level data can be associated with one or more nearby airports or other measurement stations (e.g., based on a geographic distance), such that the river level data from each river sensor is associated with weather data acquired by one or more sensors from the paired airport(s). Then, a numpy array may be generated for each hour of data. Each numpy array may comprise river levels at the desired and immediate upstream measurement stations and the weather data from the paired airport(s) or other measurement station(s). A moving window can be used to aggregate a certain number of consecutive observations into one input row in the training dataset or as one batch of the training dataset. The size of this moving window, known as the "lookback parameter," can be tuned to optimize the machine-learning model. For example, in the particular implementation, a lookback parameter of forty-eight hours, representing two days of data, provided the best results, and therefore, was used for the machine-learning model.

In the particular implementation, forecasted weather data was used to test the resulting machine-learning model. For example, forecasted weather data may be acquired from the Global Forecast System (GFS) produced by the NOAA's National Centers of Environmental Prediction. The GFS provides forecasts for fourteen days into the future, and the data is available in the General Regularly-distributed Information in Binary (GRIB) format. In the particular implementation, the GRIB-formatted files were processed, every six hours, using a Python™-based script, and stored in a PostgreSQL database (e.g., in database 114). The forecasted weather data was then utilized to provide the weather data (e.g., forecasted precipitation, temperature, and humidity) for testing the machine-learning model.

Figure 8:
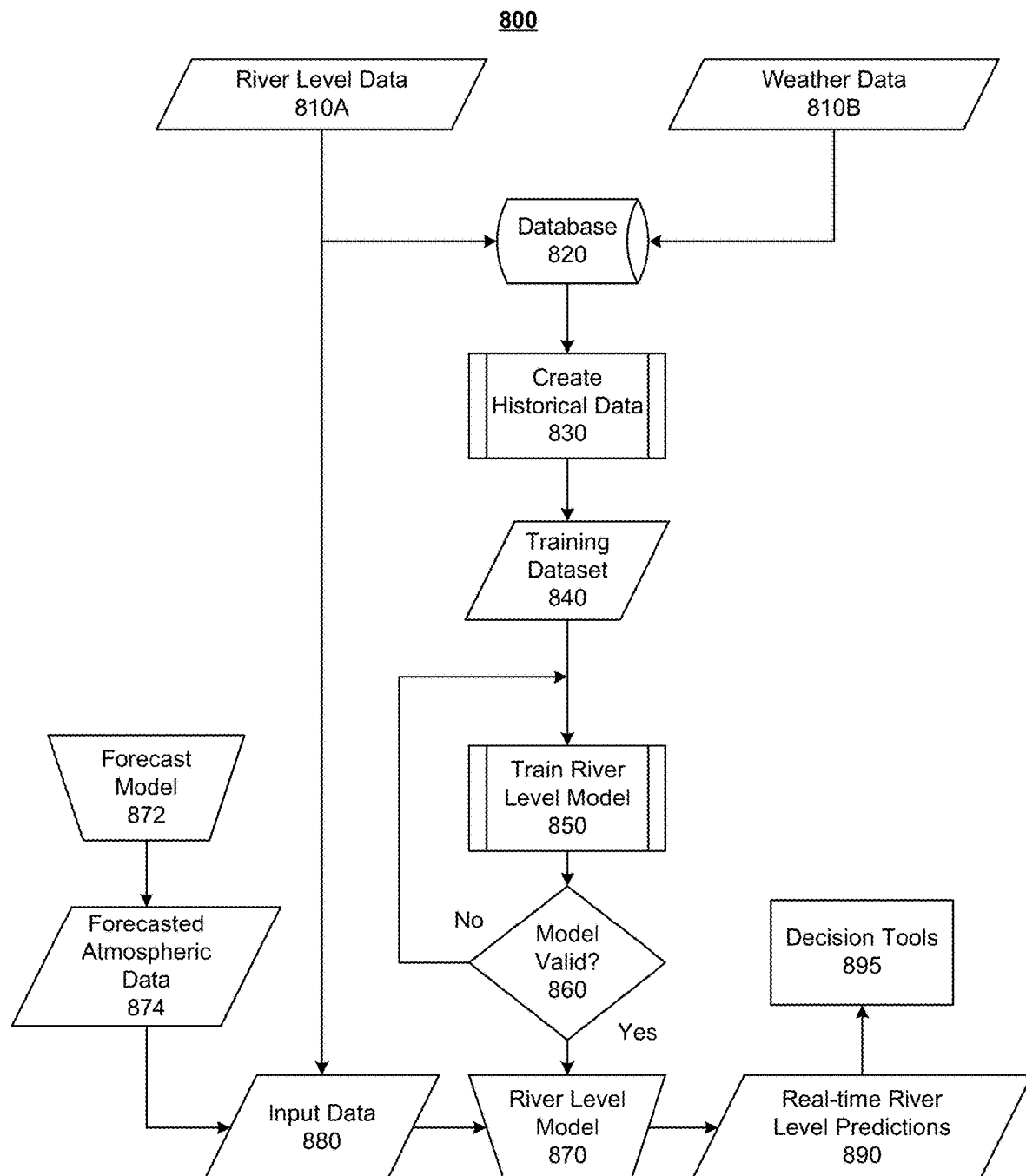
FIG. 8 illustrates an example data flow in process B of FIG. 3, according to an embodiment.

FIG. 8 illustrates a data flow 800 in process B of FIG. 3, according to an embodiment. Initially, relevant data from one or more data sources 810 are accumulated, cleaned, and stored in a database 820 (e.g., in database(s) 114). As discussed above, data sources 810 may comprise river level data 810A (e.g., from USGS sensors, and corresponding to river level data 324 in FIG. 3) and weather data 810B (e.g., from airport sensors, and corresponding to weather data 322 in FIG. 3). However, it should be understood that more, fewer, and/or different data sources 810 may be used.

Data 810 in database 820 is used to create historical data in subprocess 830 that is then used as training dataset 840, which may be split into training, validation, and testing subsets. In one particular implementation, hourly river level data 810A and weather data 810B were collected for available dates from Jan. 1, 2009 to Dec. 31, 2019. Weather data 810B was generally available during the entire time period, while some river stations only kept limited archives of river level data 810A during that time span. As a result, there were discrepancies between the number of observations available across different measurement stations. Thus, only measurement stations containing at least three years of data were carried into datasets 840.

In the particular implementation, training and testing subsets were created by dividing training dataset 840 chronologically, with the first 80% of observations included in the training subset and the remaining 20% of observations included in the testing subset. This division of data preserves the temporal autocorrelation within the observed data, and allows for the simulation of a live environment, since the testing subset forms a time series.

The training subset of dataset 840 was then used to train a river level model 870 in subprocess 850, which corresponds to subprocess 326 in FIG. 3. In an embodiment, a CNN was used as river level model 870. Due to the large number of hyperparameters and model configurations that can be generated, tuning is an important process during the course of running the CNN.

Figure 9:
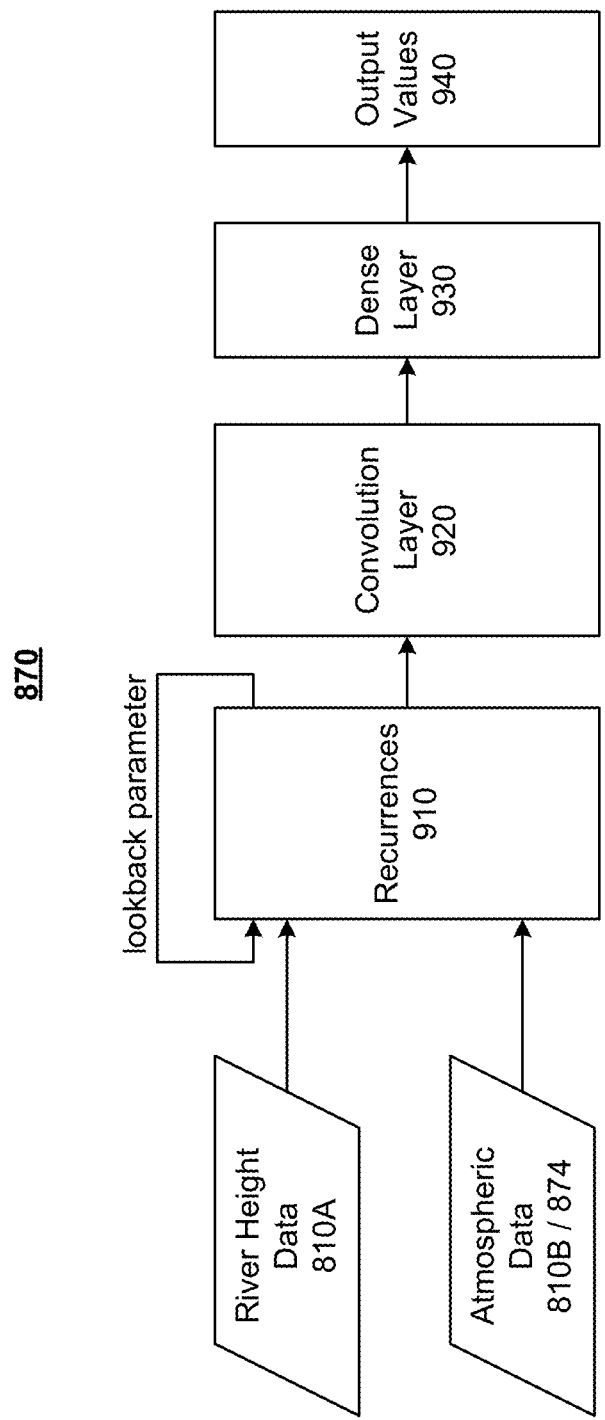
FIG. 9 illustrates an example convolutional neural network (CNN) of a river-level model, according to an embodiment.

FIG. 9 illustrates an embodiment of the CNN of river level model 870, according to an embodiment. As illustrated data is collected into recurrences 910 using a lookback parameter. Recurrences 910 (e.g., represented as an array of data) may be passed into one or more convolution layers 920 (e.g., a Keras™ Conv1D layer), in which convolution is applied. Parameters, such as the number of filters (i.e., outputs from convolution layer 920) and kernel size (i.e., size of convolution window), may be tuned to optimize model prediction. In the particular implementation, convolution layer(s) 920 had thirty-two filters and a kernel size of three. However, it should be understood that other numbers of filters may be used, and different kernel sizes may be used. Other parameters that may be tuned include, without limitation, stride length (i.e., the number of skips of the convolution window), convolution padding, activation function for convolution layer(s) 920 and/or dense layer(s) 930, training length, batch size (i.e., the number of records input through the neural model before updating weights), and/or learning rate.

In an embodiment, the output from convolution layer 920 is flattened into two dimensions and passed into one or more dense layers 930 (e.g., Keras™ notation for a fully connected normal neural network layer). Dense layer(s) 930 produce output values 940, which are considered the output for river level model 870. It should be understood that output values 940 may comprise one or more predicted river levels at one or more locations (e.g., mile marker, bridge, port, lock, etc.) on an inland waterway at one or more points in time (e.g., at hourly intervals over a time period). In an embodiment, the adaptive moment estimation (ADAM) optimizer is used to optimize computation time.

The algorithm below describes one embodiment of the training and validation of river level model 870 in subprocesses 850 and 860:

---

Example Algorithm for Training River Level Model
Input: Hourly river level data at target site and nearest upstream stations (sensor sites), and weather data at nearest station (e.g., airport), for lookback parameter (e.g., 48 hours)
Output: Trained model that predicts river levels at the target site

---

Initialization
- Merge dataframes based on time
- Account for missing data
- Normalize data
- Convert data to arrays
Model Training
- Add Convolution, flattening, and dense layers to model (e.g., Keras ™)
- Compile model with ADAM optimizer and mean squared error loss function
- Set possibilities for training parameters (e.g., number of training epochs, dense layer nodes, learning rate, and activation functions)
while all training parameters are not set do
   train model using one set of training parameters if final validation loss is better than for previous sets then
     obtain test errors using testing dataset
     spot-check forecasts against later-observed data
   end
   if test errors are not significantly different from validation errors and spot-checked forecasts roughly match observed data then
     save model
   end
end

---

In an embodiment, error is measured in terms of RMSE, which provides error values in the unit of the initial measurement, and in terms of MAE. In the particular implementation, all forecasts were made for one week in the future. This meant that the error value for a record with observed data from January 2nd at 0:00, and considering river level observations before that time within the lookback parameter, was represented as the forecast value minus the observed value on January 9th at 0:00. Error values for each observation were squared, then averaged. The square root of the resulting average is the RMSE.

The final river level model 870 may be deployed to receive input data 880, and produce real-time predictions 890 of a river level at one or more target sites. Real-time predictions 890 may be used as input to one or more decision tools 895, such as under keel clearance predictions 350, bridge clearance predictions 360, and/or maritime predictive analytics framework 370 (for use by one or more predictive analytics). Input data 880 may be derived from real-time river level data 810A (e.g., from a sensor at the target site and one or more upstream measurement stations) and weather data 874 that is forecasted by a forecast model 872. The algorithm below describes the training and validation of river level model 870 in subprocesses 850 and 860, according to an embodiment:

---

Example Algorithm for Forecasting Using River Level Model
Input: Trained forecast model for target site, river level data, weather data, GFS forecasts
Output: prediction_array, which is an array with hourly river level forecasts at the target site

---

Initialization
- Merge existing river level and weather data
- Account for missing data

---

Example Algorithm for Forecasting Using River Level Model
Input: Trained forecast model for target site, river level data, weather data, GFS forecasts
Output: prediction_array, which is an array with hourly river level forecasts at the target site

---

- Normalize river level and weather data
- Convert normalized data to arrays
- Interpolate GFS forecasts at later timesteps where forecasts are not issued hourly
- Normalize GFS forecasts on same scale as weather data
Predictions while predictions ≤ number of hours to predict do
   call prediction function of the river level model
   get normalized prediction for the river level model
   convert normalized prediction to the appropriate river level scale
   append converted prediction to prediction_array
   remove oldest values from river level and weather data arrays
   append river level forecast and relevant GFS weather forecast data to river level and weather data arrays
   predictions = predictions + 1
end
Print prediction_array

---

To demonstrate the capabilities of river level model 870, the particular implementation of river level model 870 was tested using detailed river forecasts for locations with twenty-three USGS river gage sites along the Ohio River for the period of Jan. 1, 2019 to Jun. 30, 2019. The Ohio River traverses the eastern U.S. and connects Pittsburgh, Pennsylvania to the Mississippi River. The Ohio River is critical to the U.S. economy, due to its geographical importance as a navigable waterway for the barge industry. The Ohio River is one of the primary waterways for the shipment of commodities from Pittsburgh, Pennsylvania to Cairo, Illinois, where the Ohio River joins the Mississippi and Missouri rivers. Certain stations along the Ohio River are impacted by the presence of locks, dams, and hydroelectric structures, resulting in man-made modifications to nearby water levels. There are long stretches of the Ohio River that are ungaged (i.e., without sensors), which increased potential variability. Thus, the ability of a model to predict river levels along the Ohio River with high accuracy is a strong indication that the model would be accurate for other inland waterways as well.

The table below depicts the forecast accuracy error metrics of the particular implementation of river level model 870 for each river gage station along the Ohio River, for seven-day forecasts, ending Dec. 1, 2020, and thirty-day average metrics during the period of Nov. 1, 2020 to Nov. 30, 2020:

| | | Accuracy (100 − Mean Percent Error) | |
|---|---|---|---|
| USGS Id | Location | Seven-Day | Thirty-Day |
| 03086000 | Sewickley, PA | 97.1217416 | 94.2078944 |
| 03110685 | New Cumberland (Upper) | 98.0540523 | 97.2541144 |
| 03110690 | New Cumberland (Lower) | 92.6250845 | 88.8661094 |
| 03112500 | Wheeling, WV | 98.5052687 | 94.1277087 |
| 03114275 | Hannibal L&D (Upper) | 98.7916342 | 98.6423771 |
| 03114280 | Hannibal L&D (Lower) | 71.752894 | 57.163745 |
| 03150700 | Marietta, OH | 75.174816 | 58.553585 |
| 03151000 | Parkersburg, WV | 92.416725 | 87.010680 |
| 03201500 | Point Pleasant, WV | 95.9678408 | 89.5525396 |
| 03206000 | Huntington, WV | 86.115834 | 80.823870 |
| 03216070 | Ironton, OH | 95.3311887 | 93.9099353 |
| 03217200 | Portsmouth, OH | 70.095667 | 65.018050 |
| 03255000 | Cincinnati, OH | 90.062126 | 85.957283 |
| 03277200 | Markland Dam | 81.684734 | 64.664367 |
| 03292494 | Louisville, KY (Upper) | 93.7857732 | 84.204674 |
| 03293551 | McAlpine Dam | 95.7228143 | 88.339797 |

-continued

| USGS Id | Location | Accuracy (100 – Mean Percent Error) | |
|---|---|---|---|
| | | Seven-Day | Thirty-Day |
| 03294500 | Louisville, KY (Lower) | 86.554915 | 51.716828 |
| 03294600 | Kosmosdale, KY | 84.348175 | 47.650190 |
| 03303280 | Cannelton Dam | 92.464213 | 69.271037 |
| 03304300 | Newburgh L&D | 90.19121 | 74.755403 |
| 03322000 | Evansville, IN | 94.5491023 | 80.608544 |
| 03322190 | Henderson, KY | 97.1217416 | 76.099083 |
| 03384500 | Dam 51, Golconda, IL | 98.0540523 | 97.993384 |

Fourteen of the twenty-three stations had a thirty-day predictive error with the 20% error benchmark. Stations that did not meet this benchmark tend to be located either downstream of nearby locks and dams or downstream of areas with minimal gage coverage. Thus, in an embodiment, river level model 870 can be improved by incorporating lock release information (e.g., in training dataset 840 and input data 880) and by adding gages to strategic locations in the river network.

The predictions for some stations were very accurate when compared to eventual observations. For example, 92.7% of one-day forecasts, 82.5% of two-day forecasts, and 77.0% of three-day forecasts, predicted by river level model 870 for the Ohio River at the Sewickley, Pennsylvania, station northwest of Pittsburgh, were within one foot of the eventual observations. Furthermore, 79.6% of one-day forecasts, 69.8% of two-day forecasts, and 61.3% of three-day forecasts were within half a foot (i.e., six inches) of the eventual observations. In addition, 34.5% of one-day forecasts, 28.1% of two-day forecasts, and 27.1% of three-day forecasts were spot-on (i.e., defined as having an error of less than one inch or 0.0833 foot).

River level model 870 produced the lowest RMSE values for the upper pool of the Hannibal Lock and Dam, which is a little further downstream on the border between Ohio and West Virginia, not too far downstream of Wheeling, West Virginia. For this station, every one-day forecast, two-day forecast, and three-day forecast was within one foot of eventual observations. In fact, all but one of the forecasts was within half a foot of eventual observations. Only 49.5% of one-day forecasts, 66.5% of two-day forecasts, and 60.9% of three-day forecasts were spot-on (i.e., within one inch of eventual observations). It is unusual, but not impossible, to see higher accuracies later in the prediction window, because of the hour-by-hour nature of the forecasts.

The Cincinnati, Ohio station lies in the middle of a bustling metropolis. Forecast accuracies for Cincinnati were lower than their upstream counterparts, likely due to the lack of river gages upstream. Only 74.8% of one-day forecasts for Cincinnati were within one foot, with 42.5% of forecasts being within half a foot, and 2.3% of forecasts being within one inch. Two-day forecasts also exhibited reduced accuracy, with 49.1% of forecasts being within one foot, 29.1% of forecasts being within half a foot, and 14.3% of forecasts being within one inch. Three-day forecasts showed an even stronger reduction in accuracy, with only 24.0% of forecasts being within one foot, 9.8% of forecasts being within half a foot, and 3.5% of forecasts being within an inch.

The McAlpine Dam station is near Louisville, Kentucky. The particular implementation of river level model 870 generally overpredicted river levels across the one-month span. However, 63.4% of three-day forecasts were within one foot, 30.0% of three-day forecasts were within half a foot, and 9.7% of three-day forecasts were within one inch of eventual observations. The largest predictive errors occurred between November 12th and November 17th. At the Markland Dam station, upstream of Louisville, the Ohio River swelled from a height of thirteen feet on November 19th to a crest near twenty-two feet on November 15th. River level model 870 predicted that this water would eventually make it to the Louisville area. However, the river level at the McAlpine Dam station generally stayed between twelve-and-a-half feet and thirteen feet during the abnormal period.

Dam 51 near Golconda, Illinois hosts a river gage station just upstream of the confluence of the Cumberland and Tennessee Rivers with the Ohio River. The particular implementation of river level model 870 demonstrated strong predictive accuracy for the Golconda station. The predictions strongly followed trends in the eventual observations, albeit with some overprediction of local extrema. Specifically, 98.7%, 99.5%, and 96.6% of one-, two-, and three-day forecasts, respectively, were within one foot, 93.5%, 93.1%, and 83.6% of one-, two-, and three-day forecasts, respectively, were within half a foot, and 25.1%, 24.6%, and 19.0% of one-, two-, and three-day forecasts, respectively were within one inch of the eventual observations.

It should be noted that the results may be skewed due to abnormally low water levels during the period of the data. This is particularly true in the midstream and downstream sections of the Ohio River. From Nov. 1, 2020 to Nov. 30, 2020, only two (i.e., New Cumberland L&D Upper and Hannibal L&D Upper) of the twenty-three stations reported a higher average river level than the average river level for the same time period from 2009 to 2019.

In summary, in an embodiment, river level model 870 comprises a convolutional neural network that predicts river levels. In testing of a particular implementation for twenty-three stations along the Ohio River, predictions for twenty of the stations were at least 80% accurate. There are numerous potential applications for river level model 870. For example, river level model 870 may be used to optimize business decisions for the cargo shipping industry, and/or produce accurate under-keel clearance predictions in subprocess 350 and/or bridge clearance predictions in subprocess 360 (e.g., to optimize shipping resources and/or reduce incident counts). In any case, river level model 870 can provide timely forecasts (e.g., hourly) that improve upon the daily updates provided by existing hydrological systems. More frequent updates can enable shipping companies to adjust more quickly to conditions that differ from weather forecasts.

2.4. Information Aggregation

An embodiment of the data aggregation for inland waterways, in process C in FIG. 3, will now be described in detail. The U.S. inland waterways are a critical part of the transportation network that supports the transport of commodities, consumer goods, and passengers. Transportation along the U.S. inland waterways brings in, on average, over $8.6 billion of revenue annually and is expected to increase to $9.5 billion over the next five years. With a growing U.S. economy, an increasing demand for consumer goods and major commodities (such as coal, petroleum, ore, and grain) and rising exports, this industry is expected to grow in tandem with the U.S. economy. For example, the Port of South Louisiana, which is the largest tonnage port in the U.S., alone has more than 59,000 barge movements annually.

The U.S. inland waterways are comprised mainly of the Mississippi River system and includes the Gulf Intracoastal Waterway (GIWW) that connects Gulf Coast ports, such as Mobile, New Orleans, Baton Rouge, Houston, and Corpus Christi, with the major inland ports, such as Memphis, Kansas City, St. Louis, Chicago, St. Paul, Cincinnati, and Pittsburgh. The U.S. inland waterways industry transports 20% of U.S. coal, which produces 10% of all electricity used annually in the U.S., moves 40% of U.S. petroleum and petroleum products, and carries 60% of all U.S. grain exports. A typical barge has a capacity that is fifty times greater than one rail car and sixty times greater than one semi-trailer truck. For example, one fifteen-barge tow can transport the same tonnage of cargo as 216 rail cars with 6 locomotives or 1,050 large semi tractor-trailers. The main product and service segments that utilize U.S. inland waterways are: container transportation (26% of the industry, and including standardized boxes used to transport manufactured and semi-manufactured products); towing and tugboat services (20% of the industry, and including the personnel and service industry for training personnel to navigate cargo along difficult waterway channels); liquid bulk transportation (17% of the industry, and including the transportation of crude oil, petroleum products, liquid chemicals, vegetable oils, and water); and dry bulk transportation (14% of the industry, and including the transportation of coal, iron ore, grain, bauxite, alumina, phosphate, rock, and other value-added services).

In recent years, revenue has been shaped by the transportation of grain, coal, oil, and gas products. Grain and coal are exported via the inland waterways to ports, while oil and gas products are shipped by tankers from the nation's refineries to inland areas. These shipments are affected by climate conditions that could yield lower grain shipments, and hence, lower revenue. Long term environmental conditions, such as a prevailing drought, can result in shallow inland waterways, reducing the size of shipments in the barges and the revenue generated.

Shipping via the inland waterways is far more cost effective than via rail or truck. In general, usage of the inland waterways provides a transportation cost savings of $11 per ton, relative to other modes, which could yield more than $7 billion in annual savings for the U.S. economy. Despite the cost advantages of moving freight, the inland waterways transportation market continues to grow slowly, due to the lack of technology advancement and adoption, while rail and truck industries continue to adopt new technologies. The lack of integrated technologies for river information services (e.g., electronic data interchange, navigation decision aids, barge optimization methods, etc.) has led to underperformance and inefficiency.

A major obstacle to such technologies is that inland waterways involve many different stakeholders for regulation, management, operation, and movement of cargo. As a result, a mix of standards and regulations hinders the exchange of supply-chain data among those that use those waterways. For example, in the U.S., the USACE is responsible for the waterways' infrastructure, while the USCG is responsible for waterway safety and mariner licensing. The USACE and USCG, along with other agencies that have roles on the waterways, have built separate frameworks of policies and regulations, and separate systems that support the implementation of those policies and regulations. Different districts, institutes, and laboratories act through generally informal cooperation, sometimes influenced by local needs rather than a national strategy. The lack of a standardized information infrastructure between government agencies and inefficient information-sharing capabilities makes real-time decision making difficult. This disjointed governance structure is further exacerbated by cumbersome data interchange requirements between government agencies. As a result, many of the tools that other transportation industries (e.g., rail and trucking) take for granted, are missing on the inland waterways. This has made cargo-loading optimization and voyage planning difficult for barges and other vessels. As a result, the marine transportation industry is at a competitive disadvantage in intermodal transportation decision-making. In parallel, a need exists to improve the environmental monitoring and data collection capabilities of oversight agencies and research institutes.

Accordingly, in an embodiment, a data aggregation service is provided. The data aggregation service may comprise a software platform (e.g., platform 110) that is designed to harmonize the collection, integration, analysis, and exchange of information between the marine industry and government. Standardizing data formats can enhance navigation, safety, and security in the U.S. inland waterways, and as an added benefit, reduce environmental impact while maximizing barge load and tow configurations. The data aggregation service may be a cloud-based framework that enables the exchange of river information services data through the automation of machine-to-machine communication, the development of compatible data schemes, and/or the use of data analytics. In an embodiment, the data aggregation service may enable at least the optimization of barge capacity utilization and adaptability to climate conditions.

However, increased interoperability exposes systems, networks, and remote users to increased security risks. Cybersecurity awareness in the maritime industry is low. Current automation has not been accompanied by corresponding cybersecurity. This was validated by the inaugural maritime cybersecurity survey, published by Jones Walker LLP, in which 64% of those surveyed acknowledged that their company was unprepared to handle the consequences of a data breach. In order to minimize such a risk, an embodiment of the data aggregation service provides a common cybersecurity framework, to build reciprocal trust throughout the marine transportation supply chain. This cybersecurity framework may comprise systematic and repeatable processes for persistent data confidentiality, integrity, and availability.

Currently, commercial barge operators must collect information on current waterway conditions (e.g., water depth, water current, notices to mariners, etc.) from numerous sources to efficiently and safely move commodities along U.S. inland waterways. In order to maximize profit, barges should be filled to the maximum extent that waterway conditions allow. However, due to a lack of easily obtainable information on waterway conditions, barge capacity is generally underutilized and unoptimized.

In addition, voyages along inland waterways require a wide variety of supply-chain decisions that span various jurisdictional domains. In the U.S., the maritime industry must deal with multiple federal, state, and local agencies. The information systems and processes used by each agency may be incompatible or follow non-standardized or non-electronic protocols for collecting and providing navigation and logistic information.

Furthermore, the depth of inland waterways has a significant impact on what cargo can be loaded, while the total transported tonnage directly and substantially affects profit. When planning any voyage using inland waterways, commercial cargo operators must manually consider many complex factors to efficiently and safely move commodities. Operators must determine the optimal load for any vessel for its entire voyage, which may vary due to rapidly changing environmental conditions (e.g., resulting from flooding, drought, rainfall, and snowmelt).

There is also a capability gap that poses an obstacle. For example, there is currently no capability to cost effectively transmit large amounts of digital data by industry, government, non-profit, and for-profit stakeholders for purposes such as port security, public safety, navigation safety, navigation efficiency, weather and environmental monitoring, and/or the like. To improve waterway intermodal transportation operations, stakeholders (e.g., river ports, terminals, barge operators, towers, waterway workers, drayage firms, vessel operators, shippers, railways, trucking companies, etc.) require a comprehensive river transportation information system. The absence of a collaborative data exchange and decision support tools for these stakeholders has resulted in an inefficient marine supply chain management environment for conducting business on the inland waterways.

The exchange of supply chain data and river traffic management services is very limited in U.S. inland waterways, and depends on human intervention to extract data from various websites. Because of this inefficiency, river transportation supply chain management is less attractive for movement of commodities than rail, truck, or air. This indicates that significant enhancements to maritime domain awareness, river transportation management, safe navigation, and security are required. In parallel, the growing requirement to improve the environmental monitoring and data collection capabilities of oversight agencies is evident. In turn, these needs emphasize the requirements for enhanced real-time data to improve inland waterway operations. This includes the need for cybersecurity in the system design to minimize risks to confidentiality, integrity, and availability of data interchange throughout the marine supply chain.

Figure 10:
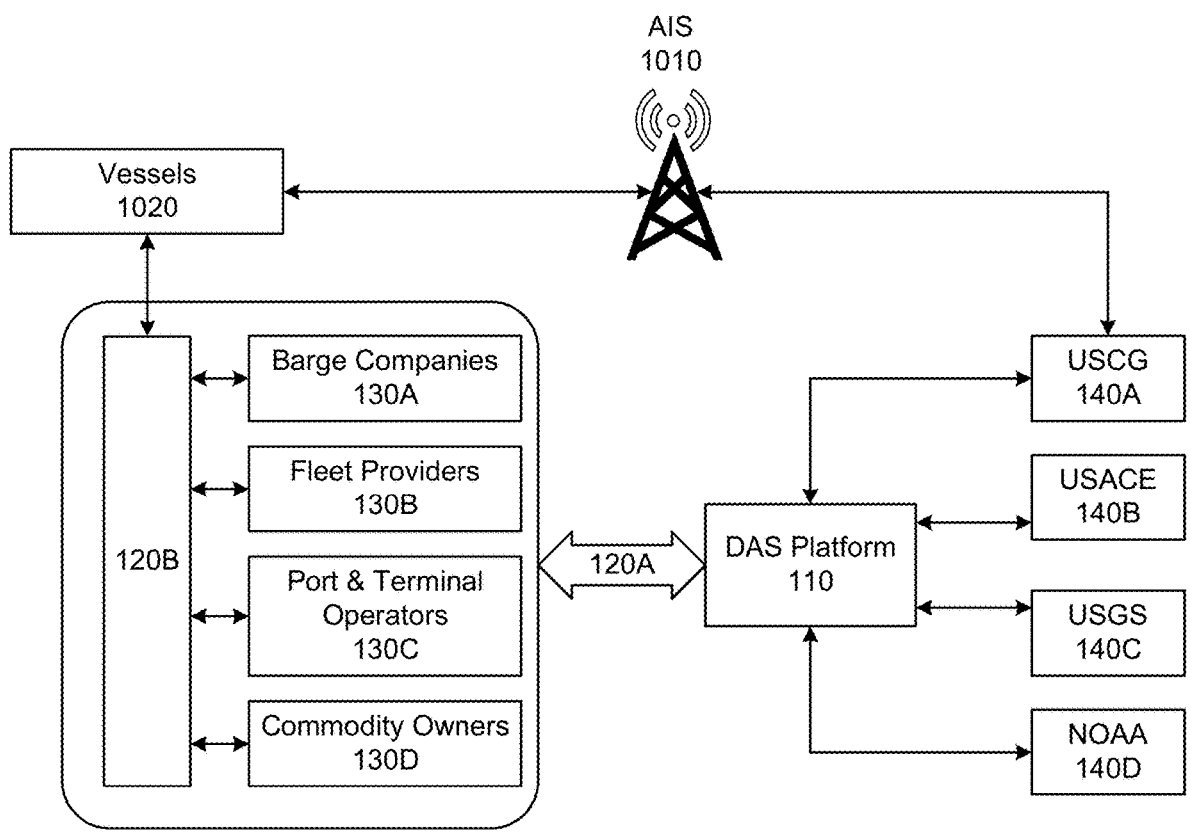
FIG. 10 illustrates an example infrastructure for a river information services (RIS) platform, according to an embodiment.

FIG. 10 illustrates an example architecture in which the data aggregation service (DAS), which may be implemented by platform 110, operates, according to an embodiment. As illustrated, the data aggregation service may provide an architectural framework that harmonizes the collection, integration, analysis, exchange, and presentation of information related to river navigation on inland waterways. The data aggregation service may be implemented as a cloud-based big-data environment with integrated data analytics (e.g., corresponding to the analytics in FIG. 3), to leverage large amounts of data from government, public, and/or commercial sources. The data analytics may be designed to help the marine transportation community grow, by providing a safer, more reliable, secure, and cost-effective transportation alternative to rail and highways. The data analytics can be used to empower users to make smarter decisions in future operations based on lessons learned from past operations. Thus, the data aggregation service can enhance inland waterway operations through information sharing.

In an embodiment, the data aggregation service of platform 110 may aggregate river navigation, safety, and commerce information from multiple sources (e.g., external systems 140). For example, these sources may include systems of the USCG 140A, the USACE 140B, the USGS 140C, the NOAA 140D, other state and/or federal government agencies, private organizations, and/or the like. These sources may supply their respective data in various formats and at various update frequencies. Advantageously, the data aggregation service of platform 110 converts the data from all of the sources into a common data format or framework.

In an embodiment, the data comprise AIS data collected by the AIS system 1010, which may be supplied by the USCG 140A.

In addition, the data aggregation service of platform 110 may present the data in a common interface (e.g., graphical user interface, API, etc.) for access by user systems 130 via one or more networks 120A. Such user systems 130 may include, without limitation, those of barge companies 130A, fleet providers 130B, port and terminal operators 130C, commodity owners 130D, and/or the like. It should be understood that the data may be accessed by other entities who may have use of it, such as lock operators, any operator in the transportation industry, responsible government agencies, and/or the like. In an embodiment, user systems 130 may utilize the data to drive management (e.g., operation, optimization, etc.) of vessels 1020, for example, via one or more networks 120B (which may be the same or different from network(s) 120A). In turn, vessels 1020 produce AIS data via AIS system 1010, which gets input back into the data aggregation service of platform 110 (e.g., via the USCG 140A).

The data aggregation service may provide a cloud-based framework for secure data exchange between all participants in the maritime industry (e.g., external systems 140 and user systems 130). In an embodiment, the data aggregation service utilizes the Context Inspired Component Architecture (CICA) for electronic transactions. CICA was developed and is maintained by the Accredited Standards Committee (ASC) X12, which is a charter of the American National Standards Institute (ANSI). In an embodiment, the data aggregation service (e.g., implemented by platform 110) provides one or more of the following functions: data acquisition; data format conversion; database storage; and/or delivery of data to users in a common and consistent format. The data may be protected and validated for accuracy, regardless of whether the data are related to reference points, commodities, locations, users, and/or the like. In addition to data from the marine industry, the data aggregation service may consume environmental data, for example, from the USGS, NOAA, USCG Notices to Mariners, USACE lock and dredging data, and/or the like.

In addition, the data aggregation service may comprise a suite of data-driven predictive analytic tools that rapidly process current and forecasted conditions to provide cargo operators with better voyage planning and more efficient transportation management. The data aggregation service may provide value-added services that integrate information from multiple sources for analysis, including voyage planning, cargo optimization, and environmental predictions. The predictive analytic tools may help users maximize performance by providing valuable insights into what drives the marine transportation supply chain and river operations. In addition, the data aggregation service may provide custom reporting that enables industry users to enhance their proprietary planning and operational support applications. For example, with the benefit of the data aggregation service to improve the scheduling of work gangs, river terminal operators may gain time and cost efficiencies. In addition, the terminals can better coordinate the scheduling of trucks and trains using more accurate arrival information, thereby eliminating one of the greatest inefficiencies on inland waterways. An increase in overall navigational efficiency of the inland waterway systems can generate further reductions in travel times by reducing or eliminating unnecessary stops (e.g., to move cargo to another transportation mode).

In an embodiment, the data aggregation service uses a systematic cybersecurity approach that manages sensitive company data and information by applying risk management processes with follow-on continuous monitoring. Given the secure data interchange framework, cargo loads can be shared confidentially among a trusted alliance of partners with a high degree of integrity to allow managed operations through a trusted data interchange (e.g., network(s) 120A in FIG. 10). As a result, users of the data aggregation service can have confidence that their data is protected in compliance with, for example, International Organization for Standardization (ISO) 27001 Information Security Management System standards.

In an embodiment, the data aggregation service provides a framework that comprises services and technologies that embrace an open architecture with common interfaces, common data formats, and shared services. Examples of services that may be provided by the data aggregation service include, without limitation, environmental information services (e.g., water levels, river currents, weather, bridge clearance, under-keel clearance, etc.), navigation services (e.g., charting services, reference data, such as RIS index, hull database, etc.), marine safety information services (e.g., waterway infrastructure inventory, notice to skippers, etc.), voyage planning services (e.g., fairway informational services, traffic management, lock status, etc.), reports and statistics (e.g., vessel operating reports, lock delays and statistics, daily lock traffic plan, etc.), and/or the like. Examples of technologies that may be provided or supported by the data aggregation service include, without limitation, situational awareness technologies (e.g., alerts, warnings, notifications, analysis tools, actionable information, etc.), various types of networks (e.g., private, open, cloud, Internet, etc.), and various types of communications (e.g., AIS, Wi-Fi™, cellular, satellite, etc.).

The data aggregation service may harvest multiple publicly and/or privately available data sources to enable access by various government, private, and/or industry end users using cloud services for their customers. The data aggregation service may leverage existing presentation formats to enable scalability that accommodates the growing number of communities of interest. The data aggregation service may comprise one or more of the following capabilities: common ingest strategy for data from multiple data sources; suite of predictive analytical tools; cyber-resilient architecture, including policy and governance to protect privacy and commercial interests; leverage of existing data sources; and/or adaptability to mobile devices.

The data aggregation service may comprise a communications layer that provides a physical communications infrastructure to transport data and information (e.g., required by RIS applications for end users and system partners), for example, through the cloud environment. The communications layer may comprise a set of available and future communication protocols that are provided by other parties. The data aggregation service can leverage existing communications capabilities (e.g., AIS and GPS) that address interoperability and data transmission security issues.

The data aggregation service may occupy a public cloud environment that integrates with existing and future RIS systems. The data aggregation service may comprise a network layer that provides Internet Protocol (IP)-based network services with built-in flexibility to accommodate various virtual network topologies, cross-layered networking techniques, and storage and data access technologies. The data aggregation service may leverage existing network capabilities, while addressing interoperability issues.

The data aggregation service may comprise a situational awareness layer that provides a data visualization interface, as well as end-user collaboration tools and services. In an embodiment, the data aggregation service is a middleware-based system, with visualization handled by the individual participants, for example, using their existing portal and display capabilities. In this case, the data aggregation service provides a web service, along with common data formats. The end users may define the user interface for their particular application (e.g., web or app) and/or operating system (e.g., Windows™, iOS™, Android™).

The data aggregation service may comprise a cybersecurity layer that complies with the Federal Information Security Management Act (FISMA), Risk Management Framework (RMF), and Federal Risk and Authorization Management Program (FedRAMP). In addition, the cybersecurity layer may be consistent with ISO 27001, to protect government and proprietary marine-industry information, operations, and assets against cybersecurity threats. Security controls within the cybersecurity layer of the data aggregation service may include encryption of data in transit (DIT) and data at rest (DAR). Access may be based on need-to-know and need-to-share permissions. The cybersecurity layer may also comprise intrusion detection and intrusion protection technologies to detect and deter inside and outside threats.

The data aggregation service may comprise a RIS layer that is dedicated to facilitating data interchange between data sources (e.g., external systems 140) and data consumers (e.g., user systems 130) through the automation of machine-to-machine data exchange, as well as the development of compatible data schemes. The data aggregation service may take advantage of existing capabilities that support or provide RIS services and identify where those RIS services can be enhanced through interoperability, enhancements to existing systems, development of new capabilities, and/or the like. In an embodiment, the data aggregation service comprises machine-learning algorithms (e.g., the machine-learning models disclosed elsewhere herein, such as TTP model 470 and/or river level model 870) to conduct ad hoc queries, generate reports, and/or analyze data. The table below illustrates an example of how the RIS layer may map the data aggregation service and technologies to RIS layer categories, and particularly, the internationally recognized RIS categories in the Permanent International Association of Navigation Congresses (PIANC) guidelines:

| Category | Environmental Info. Services | Navigation Services | Marine Safety Info. Services | Voyage Planning Services | Reports and Statistics |
|---|---|---|---|---|---|
| RIS Services | | | | | |
| Fairway Info. Services | X | | X | X | |
| Traffic Info. | | | X | X | |
| Traffic Management | | | X | X | |

-continued

| Category | Environmental Info. Services | Navigation Services | Marine Safety Info. Services | Voyage Planning Services | Reports and Statistics |
|---|---|---|---|---|---|
| Calamity Abatement Support | X | | X | | |
| Info. for Transport Logistics | | | X | X | X |
| Info. for Law Enforcement | X | | X | X | X |
| Statistics | | | | | X |
| RIS Key Technologies | | | | | |
| Inland Electronic Navigation Charts | | X | X | X | |
| AIS | | X | X | X | |
| Other Positional Data from GPS, Internet of Things (IoT), 5G sensors | | X | X | X | |
| Electronic Reporting | | | | | X |
| Notices to Skippers | X | X | X | X | X |
| Reference Data | | | | | |
| RIS Index | X | X | X | X | X |
| Hull Database | | X | | X | X |

The data aggregation service may provide data to the various machine-learning models discussed elsewhere herein (e.g., TTP model 470 and/or river level model 870). For example, current voyage planning is primarily based upon the experience of mariners and historical records kept by other waterway users. As a result, it is difficult to accurately determine the travel time of planned voyages. Thus, platform 110 may utilize TTP model 470 with data supplied by the data aggregation service to predict river traffic congestion based upon a variety of environmental and historical river traffic movement factors. The goal is to predict congestion (e.g., simultaneous arrival at one-way traffic zones, bridges, locks, etc.) and highlight those locations and times to enhance voyage planning capabilities to provide the vessel's estimated time of arrival at planned destinations and points of interest that require greater care for safe navigation. This can enhance voyage planning and provide greater situational awareness by alerting the voyage planner, lock master, terminal operators, and tow boat captains of changes in river traffic as a tow proceeds on its intended track. In an embodiment, the data aggregation service collects, analyzes (e.g., using one or more of the machine-learning models described herein), and disseminates relevant river information in real time. For example, the data aggregation service may interface with a navigation application to predict travel times (e.g., using TTP model 470), river levels (e.g., using river level model 870), under keel clearances, and/or bridge clearances, provide notifications (e.g., skipper warnings, accidents, etc.) on a virtual map, indicate traffic levels on the virtual map (e.g., using color coding to differentiate different traffic speeds), while also providing conventional navigational instructions to a vessel's skipper (e.g., overlaid on a virtual map, via audio, and/or the like).

In summary, in an embodiment, the data aggregation service, hosted by platform 110 (e.g., in the cloud), aims to be the authoritative source of data and universal framework for marine transportation information, that does not currently exist for river information services. Using cloud-based open architecture, common interfaces, and shared services, the data aggregation service may reduce duplication of efforts between multiple government river information systems, and represents a breakthrough in data interchange within the marine industry. The data aggregation service may deliver predictive analytics to facilitate advanced planning of manpower, equipment, and other resources to improve operational efficiencies for the marine transportation supply chain. The data aggregation service can also support adaptable user interface options with other products and systems (e.g., via an API) to allow end users to operate without interruptions. The data aggregation service may also possess a resilient cybersecurity infrastructure, to assure timely, secured, and accurate data and information interchange with less vulnerability to cyber-attack.

2.5. Under Keel Clearance Prediction

Currently, seagoing vessels transiting from the ocean to deep draft inland river ports lack decision tools to safely plan a river transit and avoid unnecessary offshore lightering prior to entering a port. Current under-keel clearance management solutions revolve around seaports and include decision inputs such as swell warnings, buoy reports, seaman's eye, and distant offshore pitch and roll observations. Seagoing vessels must predict this change or risk hundreds of thousands of dollars of revenue per journey or risk running aground. No decision tool currently exists that considers river conditions once a vessel is in a river channel for deep draft inland ports (e.g., the Port of South Louisiana, LA).

In an embodiment of subprocess 350, non-positional data 304 (e.g., via the data aggregation service, for example, including FCC data 410B and/or USCG 410C), regarding a vessel (e.g., a keel depth of the vessel), are combined with river level predictions from river level model 870 to predict an under-keel clearance for a particular maritime vessel. For instance, vessel characteristics in non-positional data 304 (e.g., FCC data 410B and/or USCG data 410C) for the particular maritime vessel may be used to derive the keel depth. The keel depth may then be subtracted or otherwise compared to the river level, predicted by river level model 870, to calculate the predicted clearance between the keel of the vessel and the riverbed. With respect to a given trip by the vessel, the predicted under-keel clearance may be calculated for the vessel, at one or more points along the trip, at the time that the vessel is predicted to pass each point, to predict whether or not the vessel will have sufficient under-keel clearance throughout the trip and/or at a starting or destination port facility.

It should be understood that a negative under-keel clearance at any point on a trip would indicate insufficient under-keel clearance. In addition, an under-keel clearance that is positive but less than a predefined threshold (e.g., derived from a measured error of river level model 870, such as RMSE) may be considered insufficient. In an embodiment, if the predicted under-keel clearance is insufficient at any point along a planned trip, the user may be warned (e.g., via a graphical user interface displayed on user system 130). In addition, the point at which the under-keel clearance is predicted to be insufficient may be identified to the user (e.g., on a virtual map in the graphical user interface).

2.6. Bridge Clearance Prediction

Like cargo optimization, the marine industry lacks adequate data analytics to predict bridge clearance in planning voyages on inland waterways. The current lack of standard bridge reference data from the U.S. Department of Transportation (USDOT) and insufficient coordination with the USCG and USACE exacerbate this problem. While NOAA's Physical Oceanographic Real-Time System (PORTS') provides an on-line service for major U.S. seaports, no such data currently exists for the bridges along U.S. inland waterways.

The importance of accurate bridge air gap clearance information is highlighted by two recent major accidents on U.S. inland waterways. In the first accident, on Oct. 12, 2018, a barge-mounted crane hit the load-bearing span of the Sunshine Bridge over the Mississippi River near Donaldsonville, Louisiana. This caused major damage to the integrity of the bridge, resulting in it being closed for several months and severely affecting the region's energy sector, as well as trade and commerce. In the second accident, on Dec. 25, 2018, a coal-loaded barge hit the Clark Memorial Bridge over the Ohio River in Louisville, Kentucky, resulting in nine barges breaking apart from the tug boat, seven of those barges sinking, and 10,500 tons of coal spilling into the water. Both of these accidents could have been averted if the maritime vessel operators had access to real-time information and situational awareness, river currents, river levels, and bridge air gaps.

In an embodiment of subprocess 360, non-positional data 304 (e.g., from the data aggregation service, for example, including FCC data 410B and/or USCG 410C), regarding a vessel (e.g., a height of the vessel), is combined with river level predictions from river level model 870 and bridge height data 348 (e.g., from the data aggregation service) to predict a bridge clearance for a particular maritime vessel. For instance, vessel characteristics in non-positional data 304 for the particular maritime vessel may be used to derive the vessel height. The vessel height may then be added to the predicted river level to calculate the predicted clearance between the top of the vessel and the bottom of a given bridge. With respect to a given trip by the vessel, the predicted bridge clearance may be calculated for the vessel, at each point along the trip at which a bridge passes over the waterway, at the time that the vessel is predicted to pass under the bridge, to predict whether or not the vessel will have sufficient clearance to pass under all bridges along the trip route.

It should be understood that a negative bridge air gap at any point on a trip would indicate insufficient bridge clearance. In addition, a bridge air gap that is positive but less than a predefined threshold (e.g., derived from a measured error of river level model 870, such as RMSE) may be considered insufficient. In an embodiment, if the predicted bridge air gap is insufficient at any bridge along a planned trip, the user may be warned (e.g., via a graphical user interface displayed on user system 130). In addition, the bridge at which the air gap is predicted to be insufficient may be identified to the user (e.g., on a virtual map in the graphical user interface).

2.7. Maritime Predictive Analytics Framework

In an embodiment, maritime predictive analytics framework 370 integrates multiple machine-learning-based technologies—including, for example, the travel time predictions in subprocess 312 (e.g., by TTP model 470), the river level predictions in subprocess 330 (e.g., by river level model 870), the under-keel clearance predictions in subprocess 350 (e.g., by river level model 870 in conjunction with vessel data), and/or the bridge clearance predictions in subprocess 360 (e.g., by river level model 870 in conjunction with vessel and bridge height data)—to generate predictive information that supports one or more predictive analysis tools that are unique to the maritime environment and its supply chain. In the illustrated embodiment, maritime predictive analytics framework 370 involves two main machine-learning frameworks (depicted as processes A and B in FIG. 3) that serve as key predictive sources of information for an array of maritime decision support tools, such as voyage planning 380, river traffic congestion prediction 382, cargo load optimization 384, calamity impact assessment 386, and/or calamity abatement prediction 388. In other words, travel time predictions 490 and river level predictions 890 may be used to help in voyage planning 380, river traffic congestion predictions 382, cargo load optimizations 384, calamity impact assessments 386, and/or calamity abatement predictions 388.

The machine-learning framework depicted in process A provides projections of how long it will take for a maritime vessel to travel from a given starting point to a given destination point, given a particular starting time. The travel time may be estimated, by TTP model 470, based on live (e.g., real-time) positional data 302 and non-positional data 304 (e.g., vessel dimensions and characteristics).

The machine-learning framework depicted in process B may utilize a deep-learning algorithm-based environmental model that predicts river level for a future time period (e.g., two weeks in the future) using historical river level data, historical climate observations, and weather forecast information. River level predictions 890, produced by river level model 870 (e.g., in subprocess 330), may be utilized in at least two predictive applications: (i) under-keel clearance predictions (e.g., in subprocess 350) for the future time period (e.g., predicting the water level between the lowest portion of the vessel and the bottom of the waterway); and (ii) bridge clearance predictions (e.g., in subprocess 360) for the future time period (e.g., predicting the air gap between the highest point of the vessel and lowest portion of a given bridge).

2.8. Example Usage

Various examples of how the data and AI models, described herein, may be used to enhance waterway operations will now be described in detail. It should be understood that the examples discussed herein are non-limiting, and that the disclosed data and AI models may be used in other manners than those explicitly described herein. In addition, embodiments of platform 110 may implement all or any subset of one or more of the disclosed examples. The various examples described herein may be implemented by the disclosed application, for example, as server application 112 executing on platform 110 using the data aggregated by the data aggregation service.

The example usages described herein may achieve one or more of the following non-limiting set of technical objectives:

(1) Data Analytics: leverage machine learning to aid decision makers in safe, efficient operations on inland waterways.
(2) Data Management: leverage existing standards (e.g., S-100, PIANC RIS guidelines, European Union RIS standards, S-57 standards, etc.) to provide RIS services and identify RIS requirements to be used to create new standards or modify existing standards through the appropriate standards bodies.
(3) Information Exchange: increase the exchange of RIS information between the federal government and the public, to meet the specific needs of various stakeholders.
(4) Innovation: build on existing capabilities and new capabilities and information sources, and improve the delivery of operational navigation information services to improve safety and efficiency of waterway operations and maintenance.
(5) Lock Maintenance Synchronization: develop and maintain shared awareness on planned maintenance closures with a focus on current and out-year visibility across the enterprise.
(6) Navigation Planning: enhance navigation planning so that users of inland waterways can conduct operations more efficiently and effectively.
(7) System Operability: reduce duplication of efforts among existing RIS's to increase interoperability and efficiency (e.g., using standards), while minimizing cybersecurity risks.

2.8.1. Bridge Air Gap Prediction Tool

Adequate data analytics do not exist to predict bridge clearance in planning river transit of tows. The following bridges (in order of priority) have been identified by the USGS, in cooperation with the USCG and USACE, as being the most prone to marine related incidents:

| Priority | Location | Latitude | Longitude |
|---|---|---|---|
| 1 | Vicksburg, MS (two bridges) | 32°18'51.40"N | 90°54'22.93"W |
| 2 | Ottawa II (Route 71) | 41°20'32.21"N | 88°50'26.51"W |
| 3 | Ottawa III (Rail) | 41°20'30.62"N | 88°50'48.45"W |
| 4 | Seneca | 41°18'20.99"N | 88°35'7.66"W |
| 5 | Cairo | 37° 1'23.64"N | 89°10'29.17"W |
| 6 | Parkersburg, WV | 39°16'15.29"N | 81°33'55.03"W |
| 7 | Louisville, KY | 38°15'50.23"N | 85°46'15.71"W |
| 8 | Calcasieu River Saltwater Barrier | 30°15'8.99"N | 30°15'8.99"N |
| 9 | Brazos GIWW | 28°53'45.79"N | 95°23'5.20"W |
| 10 | Olmsted Locks and Dams | 37°10'55.90"N | 89° 3'42.93"W |

The U.S. inland waterway system has over three-hundred-fifty river gage sensors that report river level. In an embodiment, the application comprises a river level model 870 comprising a deep-learning neural network, trained on more than 1.75 trillion points of river level data (e.g., 810A), to accurately predict river levels at a given river site (e.g., up to seven days in the future, in subprocess 330). The application may then use these predicted river levels, along with bridge height information (e.g., from the USDOT and/or USACE), to predict the air gap between the river and bottom of a given bridge (e.g., in subprocess 360).

Advantageously, the bridge air gap prediction tool enables mariners to estimate bridge clearances, to plan and prepare for safe navigation of their vessels under bridges along inland waterways. The bridge air gap prediction tool implicates RIS functions, such as fairway information services, traffic information services, traffic management, calamity abatement support, transport logistics information, law enforcement information, and statistics.

2.8.2. Calamity Abatement Prediction System

Currently, the USCG is unable to predict potentially hazardous river conditions to provide advanced warnings to mariners and minimize the risk of calamity events (e.g., groundings, collisions, etc.). In an embodiment, the application may comprise a calamity prediction model. The calamity prediction model may comprise a machine-learning model that is trained to predict unsafe river conditions. For example, the machine-learning model may be trained on a training dataset comprising a combination of historical river calamity incidents that have been correlated with contemporaneous navigational conditions, environment conditions, and river congestion. The machine-learning model may then operate on real-time datasets, comprising such data, to predict calamities (e.g., output the probability of a calamity event at one or more river sites).

Advantageously, the calamity prediction model could be used to generate calamity situational awareness alert levels for one or more river sites. These alert levels could be integrated with AIS and/or notices to mariners to warn mariners of potentially hazardous conditions along their voyages. For example, a mariner could be alerted if the calamity prediction model outputs a high calamity probability (e.g., a predicted likelihood that exceeds a threshold) for one or more river sites along the mariner's planned voyage. The calamity prediction model implicates RIS functions, such as fairway information services, traffic information services, traffic management, calamity abatement support, transport logistics information, and law enforcement information.

2.8.3. Calamity Impact Assessment Tool

Currently, the USCG is unable to assess the impact of a river calamity incident on vessel traffic. Nor is the USCG able to rapidly alert mariners to a change in waterway, traffic, or navigation conditions. In an embodiment, the application may use TTP model 470, by itself or in combination with one or more other models, to predict the best, worst, and/or most likely traffic impact scenarios in the event of a calamity. These predictions may be updated as conditions evolve.

For example, in an embodiment, TTP model 470 may be used in combination with the calamity prediction model described elsewhere herein. For example, maritime predictive analytics framework 370 may monitor the predictions output by the calamity prediction model. If the calamity prediction model predicts that a calamity is likely (e.g., the likelihood is above a predefined threshold), maritime predictive analytics framework 370 may input data, representing the calamity, to TTP model 470 to predict one or more traffic impact scenarios that may result from the predicted calamity.

Alerts, indicating one or more impacts of a calamity, could be broadcasted to inland-waterway stakeholders on the local notice to mariners and AIS to improve response times and coordinate resources in response to an incident or predicted incident. This calamity impact assessment tool implicates RIS functions, such as fairway information services, traffic information services, traffic management, calamity abatement support, transport logistics information, law enforcement information, and statistics.

2.8.4. Cargo Management Optimization

When planning any journey using U.S. inland waterways, commercial cargo operators must manually consider a vast range of complex factors to efficiently and safely move commodities. Operators must determine the optimal load for any vessel for its entire voyage to, from, or between inland ports, with consideration for bridge air gap clearances, high water, low water, and under keel clearances.

Thus, in an embodiment, the disclosed application comprises a predictive analytics tool (e.g., cargo load optimization 384) to help vessel traffic managers, tow boat pilots, and river lock operators maximize transport logistics and efficiently utilize all available resources. For example, cargo load optimization 384 may utilize predicted river levels from river level prediction model 870, vessel data (e.g., from non-positional data 304, such as keel depth, weight, etc.), under-keel clearance predictions (e.g., from subprocess 350), a voyage plan, and/or the like, to determine an optimal cargo load that maximizes the tonnage of the load while ensuring that there is sufficient under-keel clearance at every point along the voyage. In addition, this tool may use current and forecasted hydrographic data, meteorological data, lock status, and Marine Safety Information to help commercial cargo operators and barge operators determine optimal barge loading and tow configurations for specified commodity and other cargo movements. A particular implementation of this tool is capable of an 85%-92% confidence factor over a thirty-day period for water level predictions, depending upon locations of water gages and rain gages. This contrasts with the 30-50% confidence factor over a fourteen-day period for other physical, empirical hydrology models.

Advantageously, this tool can improve existing data resources of the data aggregation service, streamline data exchange, introduce big data analytics, and enhance decision support in the maritime environment. Government benefits include a reduction in error rate in barge, cargo type, and tonnage reporting, customized analysis of river commerce, optimized lock utilization by the marine industry, and improved response to natural disasters. The marine industry benefits include improved voyage planning, reduced lock and terminal wait times, reduced costly manual reporting requirements, improved notification of navigation hazards, and optimized scheduling of tow and barge utilization. The cargo management optimization tool implicates RIS functions, such as fairway information services, calamity abatement support, transport logistics information, and statistics.

2.8.5. Certain Dangerous Cargo Tracker

Currently, the marine industry reports certain dangerous cargo (CDC) movements to the USCG Navigation Center (NAVCEN) and USACE Lockmasters, manually or by voice reporting. Requirements for barges loaded with certain dangerous cargoes on the U.S. Inland Rivers within USCG District 8 are outlined in 33 CFR 165.830, titled "Regulated Navigation Area." CDC movement reporting requirements include the following: name of barge and towboat; name of loading, fleeting, and terminal facility; ETA and estimated time of departure (ETD) from loading, fleeting, and terminal facility; planned route(s); four hours prior to loading, dropping off, picking up, or getting under way of a covered barge; entry into the inland river area; ETA at approximately 148 designated reporting points within the inland river system; any change to ETA by more than six hours; any significant deviation from previously reported information; arrival at the barge point of discharge; leaving the inland river system; and whenever directed to report by the USCG.

Currently, fleet providers provide CDC movement data via email and regular mail. In an embodiment, the disclosed application extracts this CDC data from the vessel operating reports (VOR) of the tows. For example, the the data aggregation service of the disclosed application may interface with BargeEx™ (e.g., as an external system 140) to acquire this data. BargeEx™ is an electronic data interchange delivery system that provides an electronic exchange of transactions between barge companies and customers. The disclosed application may then send up-to-date CDC information to user systems 130 for lockmasters, port captains, NAVCEN, and any other subscribers to this data, for situational awareness and coordination.

Advantageously, the disclosed application can provide real-time tracking of CDC on inland waterways. This CDC tracker implicates RIS functions, such as traffic information services, traffic management, transport logistics information, law enforcement information, and statistics.

2.8.6. Commodity Movement Forecaster

The Waterborne Commerce Statistics Center (WCSC) of the Institute of Water Resource collects, processes, distributes, and archives vessel trip and cargo data. While the WCSC does post-event analysis of U.S. inland waterway situations, no tool currently exists to forecast commodity movements on the U.S. inland waterways, or assess the impact of current economic, environmental, and vessel movements on commodity pricing and availability.

In an embodiment, the disclosed application comprises predictive algorithms, combined with data-driven analytics, to forecast commodity movement on inland waterways. For example, VORs can be leveraged against historical commodity movement data, available through the USDOT and U.S. Department of Commerce. This can be combined with current data from the USGS, the NOAA, the USACE's LPMS, Notice to Mariners, and other related data sources to provide data analytics tool that can be hosted within the data aggregation service of platform 110.

Advantageously, this tool can help assess economic impact, in real time, given a set of environmental and vessel traffic conditions on a given segment of an inland waterway. This commodity movement forecaster tool implicates RIS functions, such as transport logistics information and statistics.

2.8.7. Commodity/Tow Diagram e-Reporting

Currently, lockmasters obtain tow pre-arrival information either by radio as the tow is within the line of sight, or upon arrival of the tow at the lock by the towboat providing a hardcopy of its manifest. Then, the lockmaster manually inputs this information into the LPMS. The marine industry is required to submit monthly reports using VORs (Form 3925x) to the WCSC per 33 CFR 207.800, titled "Collection of Navigation Statistics."

In an embodiment, the disclosed application provides commercial tow diagrams, via a web service of the data aggregation service, to the Lock Operational Management Application (LOMA) and Lock Performance Monitoring System (LPMS), using an electronically generated VOR. The data aggregation service would update the LOMA and LMPS as new information becomes available from the marine industry. The disclosed application may also verify and update the data schemas, if required, to ensure consistency in reporting.

Advantageously, this feature can deconflict simultaneous tow arrivals at a lock, and balance lock resources to break up a tow prior to going into the lock. It can also reduce errors caused by manual data input by lock operators and others in the marine industry, provide more accurate and timely information on lockages, and automate VOR updated reporting to the government. The commodity/tow diagram e-reporting tool implicates RIS functions, such as fairway information services, traffic information services, traffic management, transport logistics information, and statistics.

2.8.8. Environment Prediction Services

In an embodiment, the disclosed application provides environment prediction services. For example, the data aggregation service may use crowd sourcing, for example, via client applications 132 executing on user systems 130 (e.g., smartphones comprising or in communication with one or more sensors on board vessels), to collect real-time weather data and water quality data from vessels operating on the inland waterways. This may be in addition to the prediction of river levels by river level model 870. Advantageously, the ability to reduce environmental uncertainty in supply chain decision-making, using predicted river levels, weather data, water quality data, and/or the like, enables barge loading and commodity transport logistics to be optimized.

2.8.9. Lock Maintenance Schedule Optimization

Currently, lock maintenance scheduling is done with limited situational awareness of upcoming lockages and impacts on river traffic. Status reports are currently updated in Microsoft PowerPoint™, requiring significant daily coordination to obtain and correlate pertinent information for email distribution to stakeholders. Lockmasters are only required to alert mariners if lock maintenance takes greater than four hours.

In an embodiment, the disclosed application generates or supports delivery of lock scheduling and enterprise dashboards (e.g., in a graphical user interface or via a web service), and automatically generates lock status alerts to stakeholders. For example, the application may apply machine learning to data within the data aggregation service to optimize lock maintenance scheduling by combining projected maintenance with historical and projected lockages to minimize river traffic impact. The application may also deliver lock scheduling and enterprise dashboards that automatically generate alerts regarding lock statuses to stakeholders.

Advantageously, this can reduce the cost, time, and manpower required to update and disseminate lock maintenance status information, as well as reduce the impact of lock maintenance on river operations through better scheduling that is informed by situational awareness. The lock maintenance schedule optimization tool implicates RIS functions, such as fairway information services and traffic management.

2.8.10. Lock Operations Report

In an embodiment, the disclosed application generates a lock operations report to provide insight to local traffic congestion at any given lock in the inland waterway system. For example, for U.S. inland waterways, the lock operations report may provide instant access to data for all 191 locks in the U.S. inland waterway system. The lock operations report may integrate with the Lock Operations Management Application (LOMA) provided by the USACE.

The lock operations report may use data collected by the data aggregation service from the lock performance monitoring system (LPMS) and marine industry movement operating reports to create a visualization of commodity and tow configurations for any towboat. For example, the lock operations report may comprise a tow detail report for each towboat. The tow detail report may comprise a visual depiction of the relative positions of barges being transported by the towboat, in relation to each other and to the towboat itself. The towboat and each barge may be represented by color-coded polygons (e.g., rectangles for barges and a pentagon for the towboat). Barges that are transporting cargo that has been defined as dangerous (i.e., CDC) may be color-coded (e.g., in red) to differentiate them from barges that are not transporting dangerous cargo (e.g., in blue). Thus, barges that are transporting CDC can be quickly identified within the tow configuration. The tow detail report may also comprise additional information, such as the name and/or other identifier of the towboat, direction of travel (e.g., upstream or downstream), lock identifier, river identifier, time and date of last update, and/or a list of barges (e.g., with each row comprising the barge name, barge identifier, load status, draft, commodity being transported, cut, string, etc.).

2.8.11. Non-Commercial Vessel Lockage Coordination

Currently, there are no available automated or online methods to access pre-arrival lock transit information for non-commercial vessels based on predicted commercial vessel traffic and cargo. Non-commercial vessels must call the lockmaster within a few miles of arrival to get lock transit time estimates, and either elect to idle near the lock based on the lockmaster's current estimate, travel to the nearest available marina, or find a suitable area to anchor and wait while calling the lockmaster periodically for updated wait times.

In an embodiment, the disclosed application uses data from the data aggregation service to provide estimated lock wait times for non-commercial vessels within specified time windows. The disclosed application may estimate the lock wait time for each non-commercial vessel, based on the commercial towboat's voyage tracking and tow configuration information, the vessel's estimated arrival time window to the lock, the lock's transit times per direction and cargo capacity, and vessel lock-transit priorities. The application can update the estimated lock wait times based on commercial vessel voyage and tow configuration updates.

Advantageously, this feature of the disclosed application enables the lockmaster to provide more accurate lock transit times and potentially minimize wait time windows for non-commercial vessels at a specific lock. This feature also enables the lockmaster to provide better traffic control around and through the lock, improves non-commercial vessel voyage planning by allowing non-commercial vessels to optimize their fuel consumption, and provides possible vessel maintenance windows based on accurate lock wait times. The non-commercial vessel lockage coordination feature implicates RIS functions, such as fairway information services, traffic information services, traffic management, law enforcement information, and statistics.

2.8.12. River Currents Prediction

It is challenging for towboats to control tows during down river transits, when there are high water levels, due to excessive river currents. This is particularly true in areas where a river narrows, in large river bends, and near bridges and locks in which marine accidents are most likely to occur. Forecasts of river current conditions in such hazardous areas is essential to voyage planning and safe navigation, to minimize the likelihood of a maritime incident (e.g., grounding or collision), as well as planning barge loads and tow configurations.

The USGS maintains a sparse set of gage sensors that report discharge or river current. However, from this sparse set of sensors, a historical time series of fifteen-minute data that spans ten years and comprises over 5 million points of information per sensor can be generated. In an embodiment, the disclosed application comprises a machine-learning model (e.g., comprising a deep-learning algorithm) that is trained on this historical time series, representing past river currents, and correlated meteorological data, to accurately predict future river currents. The application may focus on points of interest where river current predictions would be most helpful, in order to improve the safety of navigation and make the tool more accurate. In addition, the data aggregation service can improve reporting of existing sensors and justify deployment of additional sensors.

Advantageously, this algorithmic approach can help provide alerts to the inland waterway community and provide futuristic and probabilistic estimates on when and where normal river conditions will or will not be exceeded. In addition, such a forecast can be valuable in determining barge loading and tow configurations, especially for downstream voyages. The river currents prediction tool implicates RIS functions, such as fairway information services, calamity abatement support, and statistics.

2.8.13. Traffic Congestion Prediction

Currently, voyage planning is based upon the experience of seasoned mariners and historical records. As a result, inconsistencies exist in determining the travel time of planned and executed voyages.

In an embodiment, the disclosed application comprises a machine-learning model that predicts congestion (e.g., simultaneous arrival at one-way traffic zones, bridges, locks, etc.) and highlights the locations and times of predicted congestion. The machine-learning model (e.g., an embodiment of TTP model 470 and/or subprocess 382) may predict river traffic congestion based upon a variety of environmental and historical river traffic movement factors (e.g., marine industry movement operating reports, GPS data from recreational vessels, environmental data, lock status information, etc.). These predictions can be used to enhance voyage planning capabilities. For example, upon receipt of a voyage plan from a vessel (e.g., tow flotilla), the application may provide the vessel's ETA (e.g., as predicted by TTP model 470) to specified or critical points (e.g., destination, locks, restricted waterways, etc.). In doing so, the application may consider lock queue data and lock delay data from the LPMS, AIS track data, and Notices to Skipper information.

Advantageously, this feature can enhance voyage planning by alerting voyage planners (e.g., towboat captains), in real time, of changes in river traffic as their vessels proceed on their intended tracks. Thus, the ETA or estimated duration of a voyage can be updated in real time throughout the voyage. The availability of such situational awareness information can be helpful in voyage itinerary decision-making. The traffic congestion prediction tool implicates RIS functions, such as fairway information services, traffic information services, calamity abatement support, and statistics.

2.8.14. Under-Keel Clearance Analysis Tool

Currently, seagoing vessels transiting from the ocean to deep draft inland river ports lack decision tools to safely plan a river transit and avoid unnecessary offshore lightering prior to entering a port. Current under-keel clearance management solutions revolve around seaports, and include decision inputs such as swell warnings, buoy reports, seaman's eye, and distant offshore pitch and roll observations. Seagoing vessels must predict this change or risk hundreds of thousands of dollars of revenue per journey or risk running aground. No decision tool exists that considers the river conditions once a vessel is in a river channel for deep draft inland ports like the Port of South Louisiana, LA.

In an embodiment, the disclosed application comprises an under-keel clearance analysis tool (e.g., machine-learning model) to optimize cargo loads of seagoing vessels, so that they may safely transit between the open ocean and inland waterway ports. Potential data that may be used by the tool (e.g., during training and operation) include current and forecasted hydro-meteorological data, lock statuses, salinity, river discharge, tides, currents, bathymetry, ship characteristics, course, and speed. The tool may use this data to predict under-keel clearance (e.g., in subprocess 350), reduce the probability of a vessel touching the waterway's bottom, and ensure safe passage of vessels. The under-keel clearance analysis tool, which may utilize machine learning, could process a variety of current and forecasted river conditions to provide the marine industry with optimal decision insights for pre-planning of cargo loads for seagoing vessels destined to inland waterway ports.

Advantageously, the tool can ensure safe under-keel clearance by a vessel during a river transit and avoid unnecessary offshore lightering of vessels prior to entering a port. The tool can also offer real potential savings to shippers and terminal operators by improving the scheduling of port resources (e.g., cranes, tugs, pilots, barges, etc.) using verifiable arrival information, thereby eliminating one of the greatest inefficiencies on the waterways. The tool may also reduce the probability of touching the channel bottom, resulting in avoiding unnecessary material and environmental damages. This under-keel clearance analysis tool implicates RIS functions, such as fairway information services, traffic information services, calamity abatement support, transport logistics information, and statistics.

2.8.15. Water Level Prediction

Existing hydrology-based models predict water levels with a confidence factor of 30-50% up to three days using empirical data only. Thus, a need exists to provide more accurate predictions of river water levels over an extended time period, to enhance decision making in voyage planning and environmental disaster planning and response.

Thus, in an embodiment, the disclosed application provides water or river level predictions (e.g., via river level model 870), for example, using river level sensor data from the NOAA, precipitation data from the National Weather Service (NWS), data from the USGS, and/or the like. For example, a particular implementation of river level model 870 was able to accurately predict water levels with a confidence factor of 85% to 92% out to fourteen days using river height and precipitation data (e.g., collected by the data aggregation service). The application may provide a real-time predictive analytics dashboard that provides dynamic and accurately forecasted river level conditions, thereby allowing enhanced decision making for voyages along inland waterways.

Advantageously, the water level prediction tool provides improved predictive water level insights to help commercial cargo operators and the marine industry determine optimal barge loading and tow configurations for any specified commodity or other cargo movement. In addition, the tool offers insights to the USCG, USACE, Federal Emergency Management Agency (FEMA), and others in planning for extreme river conditions (e.g., flooding, drought, etc.). The water level prediction tool implicates RIS functions, such as fairway information services, traffic information services, calamity abatement support, and statistics.

2.9. Example Graphical User Interface

As discussed elsewhere herein, the application (e.g., server application 112 on platform 110) may provide a graphical user interface, which enables users to access and utilize any subset of the functions, models, subprocesses, tools, and/or the like described herein. FIGS. 11A-11G illustrate various screens (e.g., implemented as webpages) of such a graphical user interface, according to an embodiment.

Figure 11A:
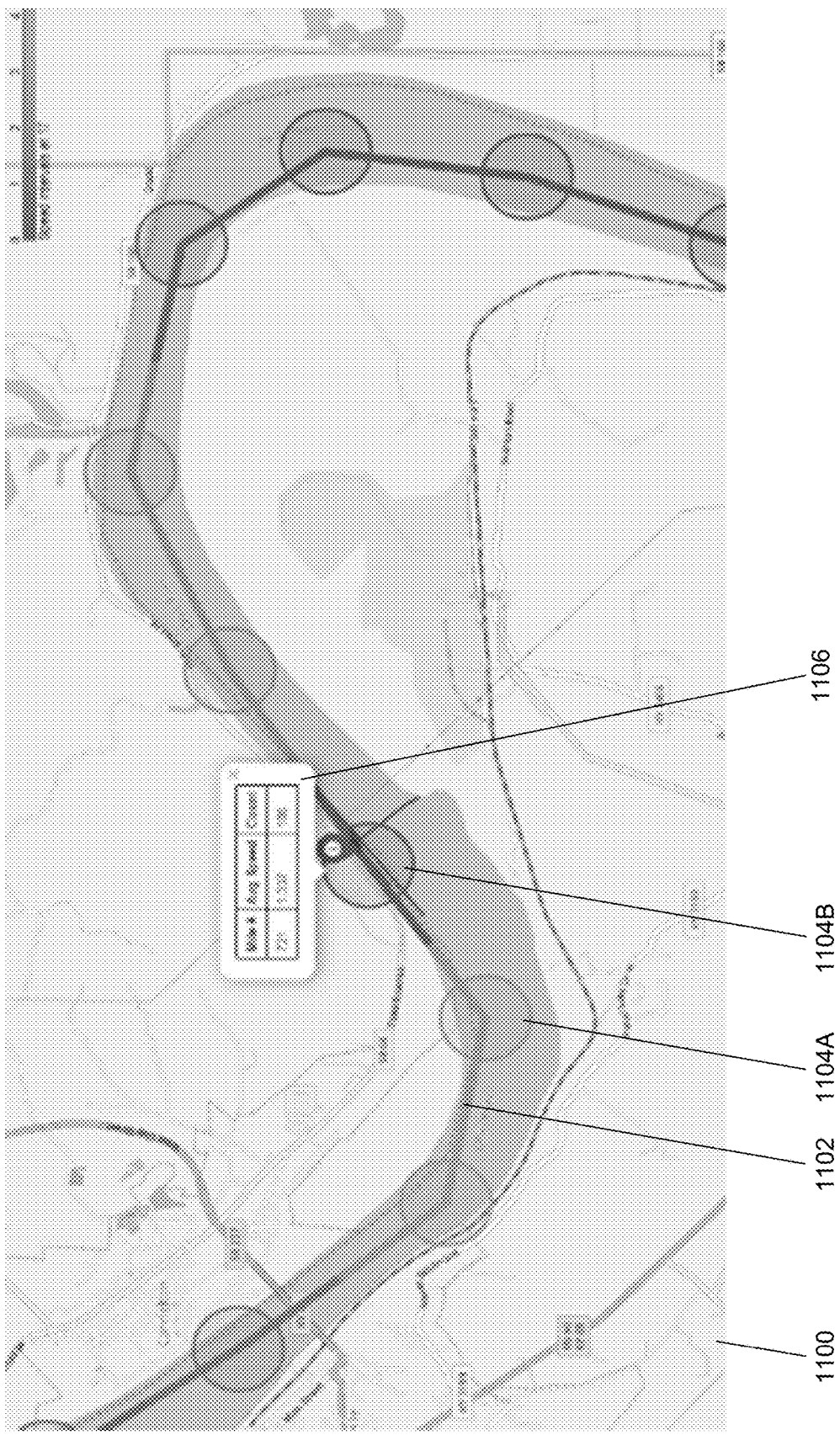
FIGS. 11A-11G illustrate a graphical user interface, according to embodiments.

FIG. 11A illustrates a screen for travel time prediction, according to an embodiment. For instance, this screen utilizes the real-time travel time predictions 490 by TTP model 470 in subprocess 312. In an embodiment, the screen comprises a virtual map 1100 that illustrates waterways within a view of a geographical map. The view of the geographical map may be changed by well-known user operations to scroll or pan (e.g., via click and drag of an input device such as a mouse or track ball attached to a user system 130, touch and slide of a finger or stylus on a touch panel display of a user system 130, selection of a dedicated input on the screen, etc.), zoom in (e.g., via a scroll wheel on an input device, pinch-out on a touch panel display, selection of a dedicated input on the screen, etc.), zoom out (e.g., via a scroll wheel on an input device, via a pinch-in on a touch panel display, selection of a dedicated input on the screen, etc.), and/or perform other user manipulations.

Each waterway for which there is traffic information may comprise a traffic indicator 1102 overlaid over the waterway. Traffic indicator 1102 may comprise different colors to indicate different levels of traffic (e.g., green to indicate light to no traffic, yellow to indicate medium traffic, red to indicate heavy traffic, and variations/shades/combinations of these colors to indicate intermediate levels of traffic). The traffic levels indicated by traffic indicator 1102 may be determined from historical and/or real-time data (e.g., positional data 302 collected for a plurality of historical trips or in real time by GPS devices on maritime vessels 1020 as they travel the waterway, observational data compiled by observers or automated equipment at established mile markers or other positions along the waterway, etc.), and may account for other data, such as weather data (e.g., 322) and/or the like.

Traffic indicator 1102 may comprise a plurality of markers 1104, which may represent established mile markers or other positions on the respective waterway. A user may select one of markers 1104 to view detailed information related to the waterway at the position represented by the marker 1104. In the example illustrated in FIG. 11A, the user has selected marker 1104B. In response to the selection of marker 1104B, the graphical user interface may display a pop-up frame 1106 overlaid on virtual map 1100 at or near the position of the selected marker 1104B. Pop-up frame 1106 comprises the detailed information related to the waterway at the position represented by the selected marker 1104B. For example, the detailed information may comprise an identifier of the position (e.g., the mile marker number), an average speed at the position (e.g., a predicted speed based on historical data, or an observed real-time speed), a count (e.g., a number of vessels predicted or observed at the position per a unit of time), and/or the like. However, it should be understood that the detailed information may comprise more, fewer, or different types of data.

Figure 11B:
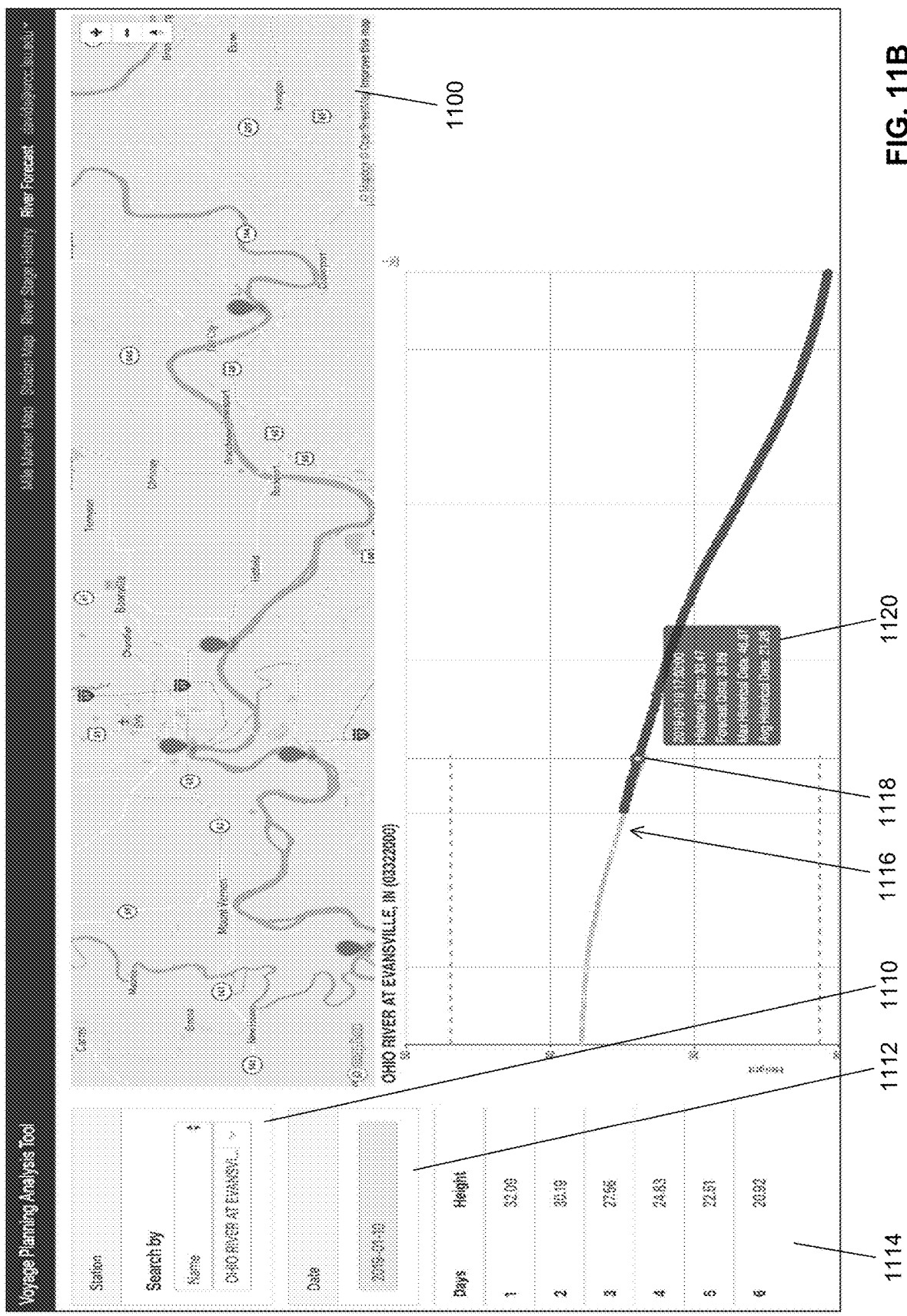
Figure 11C:
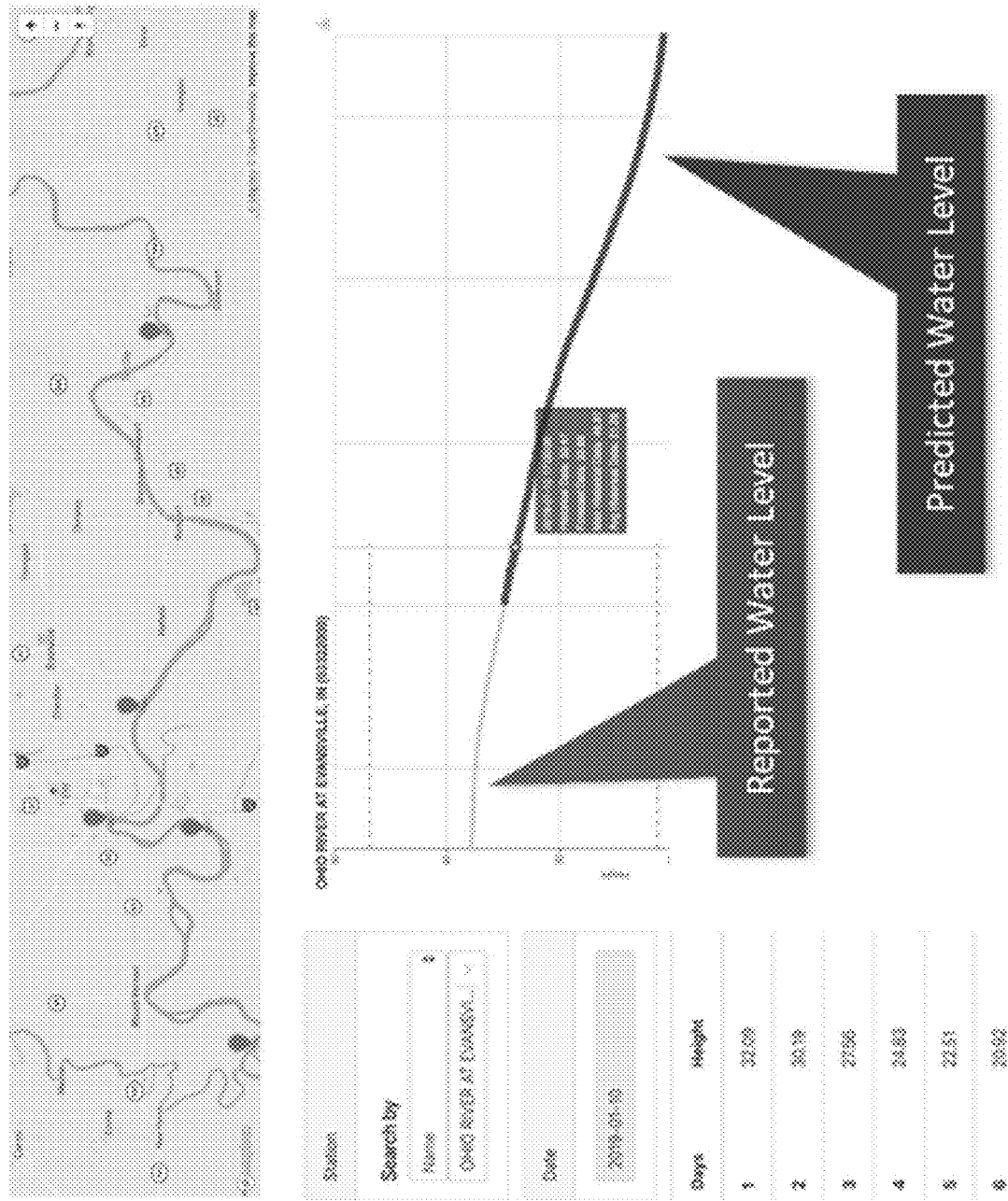

FIGS. 11B and 11C illustrate a screen for river level prediction, according to an embodiment. For instance, this screen utilizes river level predictions 890 by river level model 870 in subprocess 330. In an embodiment, the screen comprises virtual map 1100, which may be the same, similar, or different than the virtual map 1100 in other screens described herein.

The screen may also comprise a selection frame 1110, which comprises an input for selecting a position on a waterway. For example, selection frame 1110 may comprise a drop-down menu of all available positions, a text box for inputting and/or searching for the name of a position (e.g., by river and city name, potentially with predictive search options), and/or any other input(s) for selecting a particular position on the waterway. In an embodiment, the user may also select a marker or point on virtual map 1100, and the position associated with the selected marker or point may be populated into search frame 1110.

The screen may also comprise a date frame 1112, which comprises an input for selecting a particular date. For example, date frame 1112 may comprise a calendar pop-up for selecting a particular date, a text box for inputting a particular date in one or more formats, and/or any other input(s) for selecting a particular date.

The application receives the position on a particular waterway, selected in selection frame 1110, and the date, selected in date frame 1112, and graphs a river level (also referred to as "river height" or "river stage") at that selected position using that selected date. For example, the application may generate a chart 1114 and/or graph 1116 of river levels for a plurality of time intervals (e.g., days, hours, etc.) starting on the selected date. Chart 1114 may comprise a table of days (e.g., the selected day and a plurality of consecutive subsequent days) and river levels (e.g., in feet) for each of those days. Graph 1116 may comprise a line graph showing the river level at the selected position over time, starting from or around the selected date.

Depending on the selected date, chart 1114 and graph 1116 may comprise actual historical river levels (e.g., reported river levels), predicted river levels (e.g., real-time river level predictions 890 predicted by river level model 870 in subprocess 330), or a combination of historical and predicted river levels for the selected position. For example, if the selected date is in the future, chart 1114 and graph 1116 may comprise only predicted river levels starting on the selected date and including several subsequent dates (e.g., six to ten subsequent days). If the selected date is far in the past, chart 1114 and graph 1116 may comprise only historical river levels. However, in the illustrated example, the selected date is in the recent past, such that chart 1114 and graph 1116 comprise historical river levels up to the current time and predicted river levels beyond the current time. This is highlighted in FIG. 11C. The portion of graph 1116 comprising historical river levels may be distinguished from the portion of graph 1116 comprising predicted river levels by using different line colors, line weights, and/or the like.

A user may select any point or any of an indexed set of points on graph 1116 to view detailed information related to that point. In the example illustrated in FIG. 11B, the user has selected a point 1118 (e.g., by hovering over point 1118 with an input device, by clicking on point 1118 with the input device, by touching point 1118 on a touch panel display, etc.) on the portion of graph 1116 that represents predicted river levels. In response to the selection of point 1118, the graphical user interface may display a pop-up frame 1120 overlaid on graph 1116 near the selected point 1118. Pop-up frame 1120 comprises the detailed information related to that point 1118. For example, the detailed information may comprise the time (e.g., date and time) represented by point 1118, historical river level for the selected position at the time represented by point 1118, predicted river level for the selected position at the time represented by point 1118, maximum historical river level for the selected position at the time represented by point 1118, average historical river level for the selected position at the time represented by point 1118, and/or the like. However, it should be understood that the detailed information may comprise more, fewer, or different types of data.

Figure 11D:
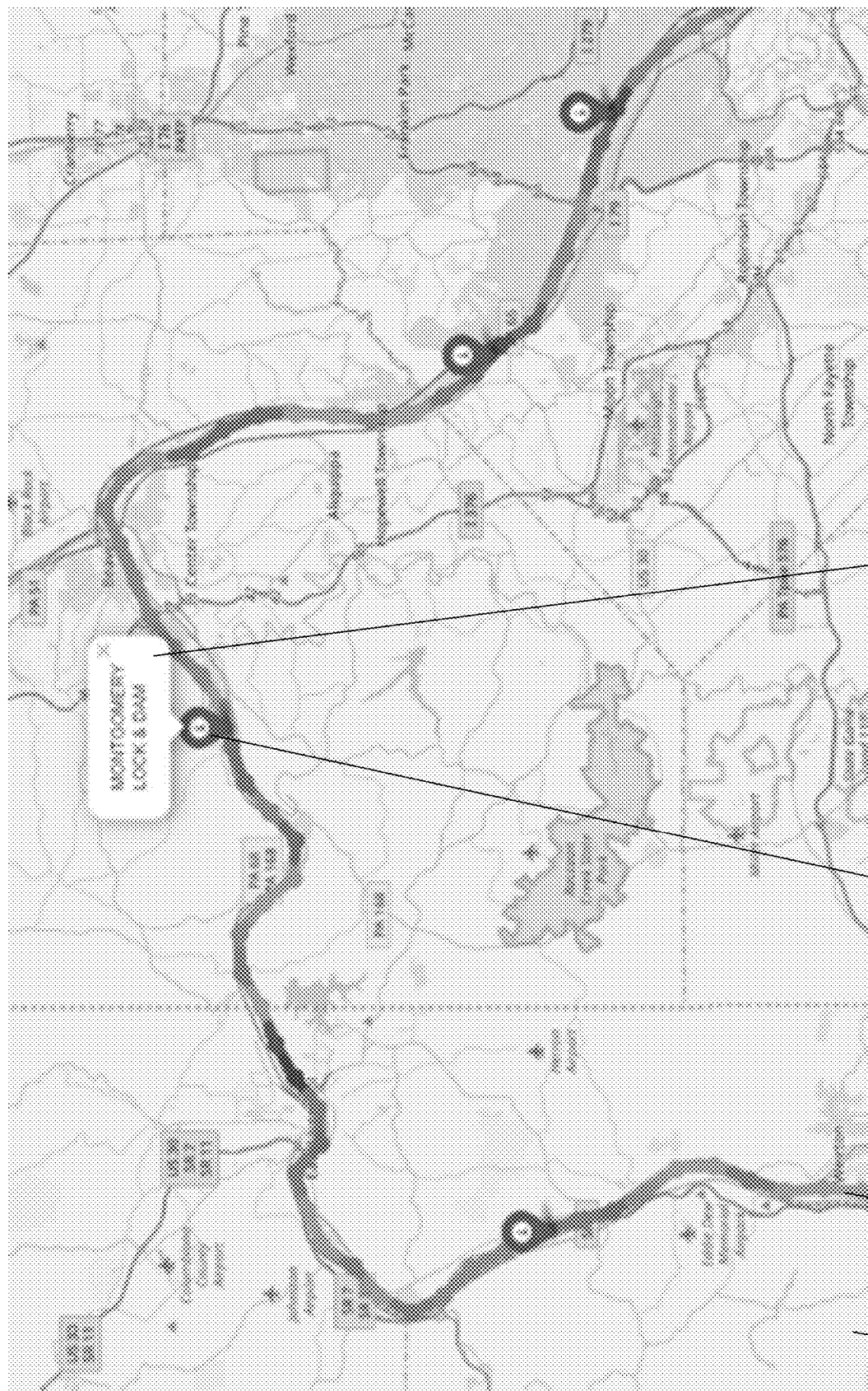

FIG. 11D illustrates a screen for river traffic congestion, according to an embodiment. For instance, this screen provides user access to the river traffic congestion predictions of subprocess 382. In an embodiment, the screen comprises virtual map 1100, which may be the same, similar, or different than the virtual map 1100 in other screens described herein, as well as traffic indicator 1102, which may be the same, similar, or different than the traffic indicator 1102 in other screens described herein.

In an embodiment, traffic indicator 1102 is coextensive with the waterway(s) being represented in virtual map 1100. Traffic indicator 1102 may comprise a plurality of segments that are colored according to a level of traffic along the portion of waterway represented by that segment. For example, dark green may represent no traffic, dark red may represent heavy traffic, and shades of lighter green(s) to yellow(s) to lighter red(s) may represent varying degrees of traffic along the spectrum from no traffic to heavy traffic.

Feature indications 1130 may be positioned on traffic indicator 1102 to represent features at the corresponding position on the waterway. Examples of features include locks, dams, ports, bridges, other facilities, calamities, calamity-prone areas, and/or the like. Each feature indication 1130 may be selectable. A user may select one of feature indications 1130 to view detailed information about the feature. In response to the selection of a feature indication 1130, the graphical user interface may display a pop-up frame 1132 overlaid on virtual map 1100 at the position of the selected feature indication 1130. Pop-up frame 1132 comprises the detailed information related to the feature represented by the selected feature indication 1130. For example, the detailed information may comprise an identifier of the feature. However, it should be understood that the detailed information may comprise more or different types of data.

Figure 11E:
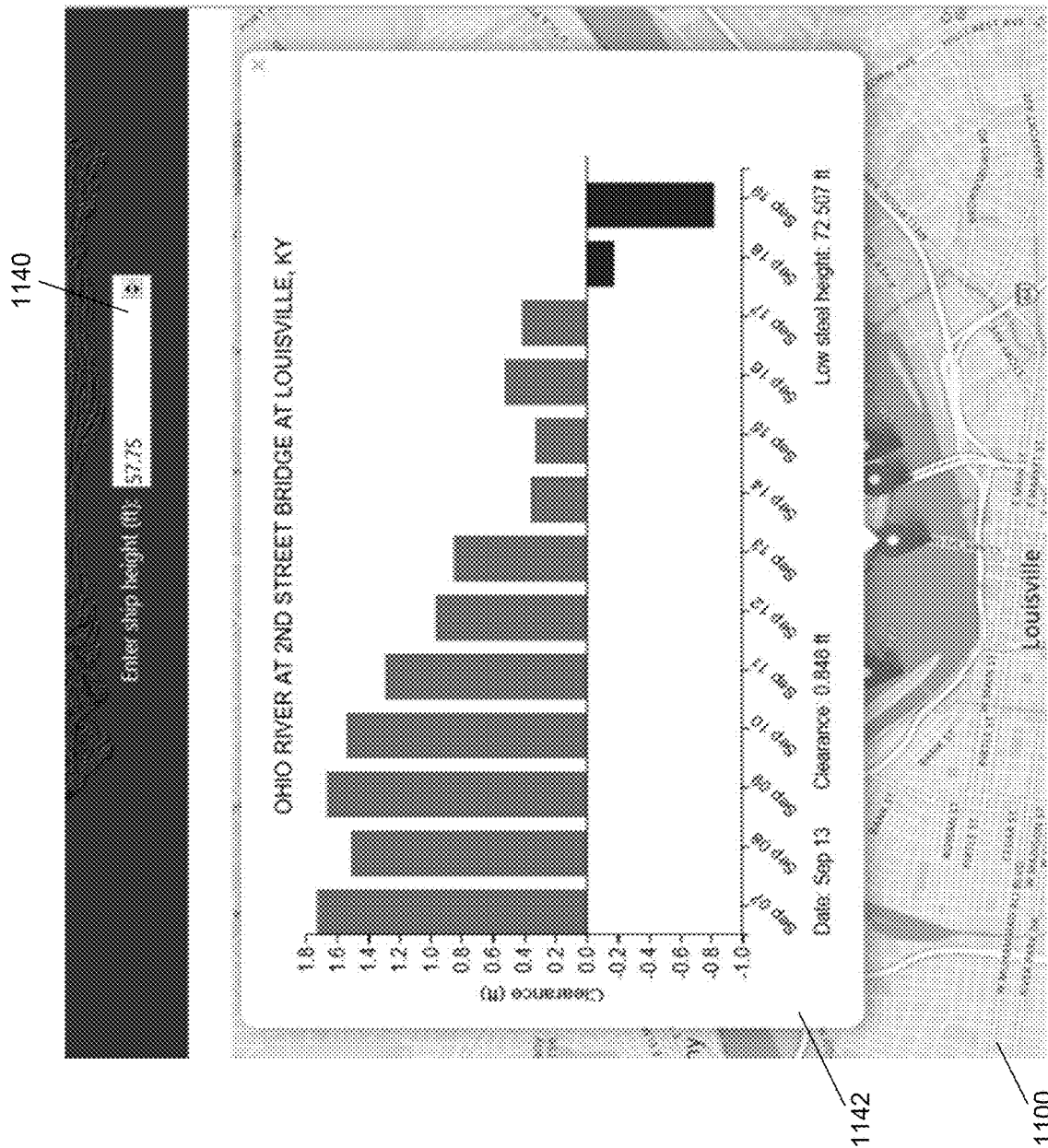
Figure 11F:
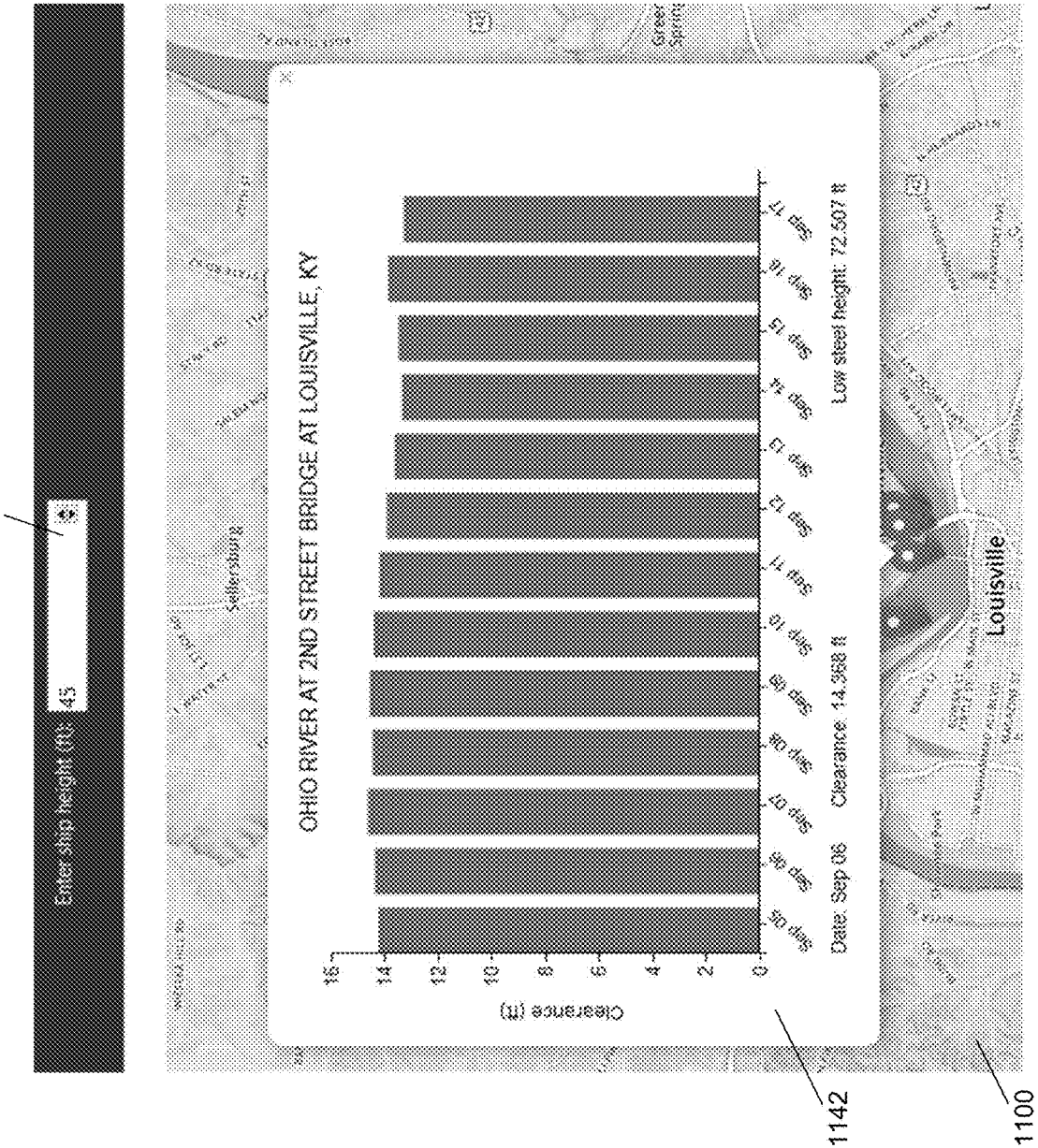
Figure 11G:
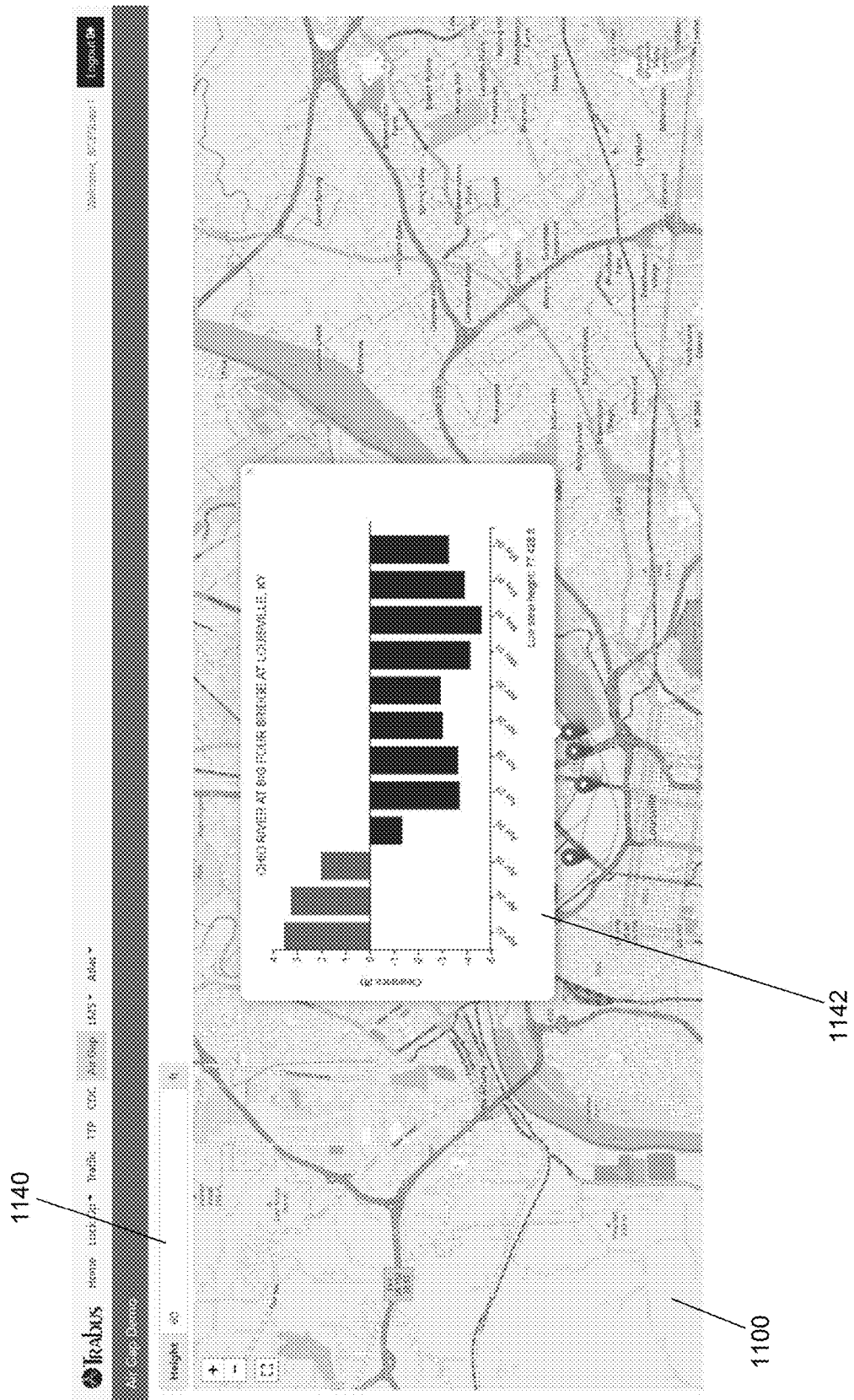

FIGS. 11E-11G illustrate screens for bridge clearance prediction, according to an embodiment. For instance, these screens utilize the bridge clearance predictions of subprocess 360 (which in turn may use real-time river level predictions 890 output by river level model 870 in subprocess 330). In an embodiment, the screen comprises virtual map 1100, which may be the same, similar, or different than the virtual map 1100 in other screens described herein.

The user may select a bridge from virtual map 1100 (e.g., by selecting a feature indication 1130) or by any other implemented means. In response to the selection of a bridge, the application may update the graphical user interface to provide an input 1140 for specifying a vessel height (e.g., in feet). In response to the entry of a vessel height into input 1140, the application may generate an information frame 1142 near the selected bridge, which comprises a chart (e.g., bar chart) of the predicted clearance between the specified vessel height and the selected bridge for a plurality of days (e.g., starting with the current day and including a plurality of consecutive subsequent days). Information frame 1142 may also comprise additional information, such as a date, clearance, and low steel height for a selected day (e.g., in response to selection of a particular bar in the bar chart).

As illustrated, negative clearances may be distinguished from positive clearances, for example, using different colors (red for negative clearances, blue or green for positive clearances, etc.) and/or other distinguishing characteristics. It should be understood that a positive clearance indicates that, according to the predicted river levels on the indicated date, a maritime vessel of the height, specified in input 1140, will clear the bridge, whereas a negative clearance indicates that, according to predicted river levels on the indicated date, a maritime vessel of the specified height will not clear the bridge. Accordingly, a user may utilize the information in information frame 1142 to plan a trip for a maritime vessel of the specified height along the waterway, so as to avoid dates with negative predicted bridge clearance amounts or insufficiently positive predicted bridge clearance amounts (e.g., positive predicted bridge clearance amounts that are within an error amount of the river level prediction model and/or below a safety threshold).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
  use a training dataset, comprising positional and non-positional data representing trips with known travel times along a waterway, to train a travel time prediction model to predict a travel time along the waterway for a given trip;
  for each trip of one or more trips by a maritime vessel along the waterway,
    receive a request that specifies that trip and a time of that trip, and
    in response to the request,
      use the travel time prediction model to predict a travel time for that trip, and
      display a representation of that trip on a virtual map within a graphical user interface with an indication of the predicted travel time.

2. The method of claim 1, wherein the travel time prediction model comprises a gradient boosting model.

3. The method of claim 2, wherein the gradient boosting model comprises an XGBoost model.

4. The method of claim 3, wherein training the XGBoost model comprises optimizing parameters of the XGBoost model using a random search.

5. The method of claim 2, wherein training the travel time prediction model comprises applying cross-validation using mean absolute percentage error.

6. The method of claim 1, wherein the travel time prediction model comprises a support vector machine.

7. The method of claim 1, further comprising generating the training dataset, wherein generating the training dataset comprises correlating positional data, indexed by first identifiers of vessels, with non-positional data, indexed by second identifiers of vessels.

8. The method of claim 7, wherein the first identifiers are Maritime Mobile Service Identities.

9. The method of claim 8, wherein the second identifiers are U.S. Coast Guard identification numbers.

10. The method of claim 1, wherein the positional data comprise, for each of a plurality of vessels, information representing trips that the vessel completed along a waterway.

11. The method of claim 10, wherein the positional data comprise Automatic Identification System (AIS) data comprising a plurality of AIS messages, and wherein generating the training dataset further comprises creating a plurality of training trips from the positional data and non-positional data by, for each of the plurality of vessels, bundling a subset of the plurality of AIS messages, in which the vessel is identified, together into one or more trips, based on one or more criteria.

12. The method of claim 11, wherein the one or more criteria comprise:
    each subset must comprise a plurality of AIS messages;
    an AIS message is not added to a non-empty subset unless either
        a time interval between the AIS messages and an AIS message in the subset is less than or equal to a first predefined threshold, or
        the time interval is less than a second predefined threshold, which is greater than the first predefined threshold, and the vessel traveled at least a predefined speed during the time interval; and
    a training trip ends whenever either
        a speed of the vessel becomes zero,
        a direction of the vessel changes between upstream and downstream, or
        the vessel stops at a lock.

13. The method of claim 1, wherein the non-positional data comprise, for each of the plurality of vessels, one or more attributes of the vessel.

14. The method of claim 13, wherein the one or more attributes of the vessel comprise at least one physical dimension of the vessel.

15. The method of claim 1, wherein the travel time is an estimated time of arrival.

16. The method of claim 1, wherein the waterway is logically divided into a plurality of channels that are logically connected via a directional graph network, and wherein the travel time prediction model comprises a separate model for each of the plurality of channels.

17. The method of claim 1, wherein the training dataset further comprises statistical features of the waterway.

18. The method of claim 1, further comprising, for each of the one or more trips, updating the indication of the predicted travel time, in real time, based on real-time predictions of the travel time for the trip by the travel time prediction model.

19. A system comprising:
    at least one hardware processor; and
    software that is configured to, when executed by the at least one hardware processor,
    use a training dataset, comprising positional and non-positional data representing trips with known travel times along a waterway, to train a travel time prediction model to predict a travel time along the waterway for a given trip, and
    for each trip of one or more trips by a maritime vessel along the waterway,
        receive a request that specifies that trip and a time of that trip, and
        in response to the request,
            use the travel time prediction model to predict a travel time for that trip, and
            display a representation of that trip on a virtual map within a graphical user interface with an indication of the predicted travel time.

20. A non-transitory computer-readable medium having instructions stored therein, wherein the instructions, when executed by a processor, cause the processor to:
    use a training dataset, comprising positional and non-positional data representing trips with known travel times along a waterway, to train a travel time prediction model to predict a travel time along the waterway for a given trip; and
    for each trip of one or more trips by a maritime vessel along the waterway,
        receive a request that specifies that trip and a time of that trip, and
        in response to the request,
            use the travel time prediction model to predict a travel time for that trip, and
            display a representation of that trip on a virtual map within a graphical user interface with an indication of the predicted travel time.

* * * * *